US008181687B2

(12) United States Patent
Mitsui et al.

(10) Patent No.: US 8,181,687 B2
(45) Date of Patent: May 22, 2012

(54) TRANSFER TOOL

(75) Inventors: Takashi Mitsui, Osaka (JP); Kinya Matsushita, Osaka (JP)

(73) Assignee: Kokuyo Co., Ltd., Osaka (JP)

( * ) Notice: Subject to any disclaimer, the term of this patent is extended or adjusted under 35 U.S.C. 154(b) by 924 days.

(21) Appl. No.: 10/572,940

(22) PCT Filed: Apr. 26, 2005

(86) PCT No.: PCT/JP2005/007932

§ 371 (c)(1),
(2), (4) Date: Jul. 29, 2008

(87) PCT Pub. No.: WO2005/108113

PCT Pub. Date: Nov. 17, 2005

(65) Prior Publication Data

US 2008/0283194 A1 Nov. 20, 2008

(30) Foreign Application Priority Data

May 6, 2004 (JP) ............................... P2004-137807

(51) Int. Cl.
*B32B 37/26* (2006.01)
*B26F 3/02* (2006.01)
*B43L 19/00* (2006.01)

(52) U.S. Cl. ......................... 156/577; 156/574; 156/579

(58) Field of Classification Search .................. 156/238, 156/574, 577, 579; 118/207
See application file for complete search history.

(56) References Cited

U.S. PATENT DOCUMENTS

| | | | | |
|---|---|---|---|---|
| 2,346,142 | A | 4/1944 | Anderson | |
| 3,969,181 | A | 7/1976 | Seabold | |
| 4,718,971 | A | 1/1988 | Summers | |
| 5,122,108 | A | 6/1992 | Segalowitz et al. | |
| 5,314,567 | A | 5/1994 | Noll | |
| 6,098,685 | A * | 8/2000 | Maeda | 156/391 |

(Continued)

FOREIGN PATENT DOCUMENTS

JP 2002-127681 A 5/2002

(Continued)

OTHER PUBLICATIONS

European Office Action dated Jun. 8, 2009, issued in corresponding European Patent Application No. 05 737 131.2.

*Primary Examiner* — Mark A Osele
(74) *Attorney, Agent, or Firm* — Westerman, Hattori, Daniels & Adrian, LLP

(57) ABSTRACT

To provide a transfer tool that can be preferably used without a table such as a desk and can easily carry out the transfer operation in any places, the transfer tool includes a transfer tool main body (1) and a transferred object receiver (2) that is accompanied by the transfer tool main body (1), wherein an insertion space (AS) in which a paper slip (P) can be inserted is formed between the transfer tool main body (1) and the transferred object receiver (2); a transfer head (H) is positioned so that at least a transfer face (RTa) of the transfer head (H) is exposed in the insertion space (AS); and a tape glue (T) is transferred on the paper slip (P) by slidably moving the transfer face (RTa) in a predetermined transfer direction while bringing the transfer face (RTa) into contact with the paper slip (P) with the paper slip (P) inserted in the insertion space (AS) and the paper slip (P) sandwiched between the transfer tool main body (1) and the transferred object receiver (2).

29 Claims, 10 Drawing Sheets

U.S. PATENT DOCUMENTS

| | | | | |
|---|---|---|---|---|
| 6,508,287 | B1 * | 1/2003 | Shinozaki et al. ............ | 156/391 |
| 6,698,489 | B1 * | 3/2004 | Shinozaki et al. ............ | 156/574 |
| 6,748,993 | B1 * | 6/2004 | Shinozaki et al. ............ | 156/391 |
| 6,796,351 | B1 * | 9/2004 | Maeda .......................... | 156/391 |

FOREIGN PATENT DOCUMENTS

| | | | |
|---|---|---|---|
| JP | 2002-178694 | A | 6/2002 |
| JP | 2005-289050 | A | 10/2005 |
| JP | 2006-205525 | A | 8/2006 |

* cited by examiner (a)

(b)

TRANSFER TOOL

TECHNICAL FIELD

The present invention relates to a transfer tool used for transferring a transfer material on a transferred object such as paper.

BACKGROUND ART

Conventionally, various transfer tools have been created, which are used when transferring a transfer material such as solid or liquid glue, a tape such as an adhesive tape and an incohesive tape, and an adhesive or the like on a transferred object such as paper. It is usually the case that the transfer tool for transferring such a transfer material is provided with a case holding the transfer material therein and a transfer head for transferring the transfer material held in the case to the transferred object. This transfer head serves to transfer the transfer material on the transferred object contacting the transferred object. Such a transfer tool is configured so as to transfer the transfer material on the surface of the transferred object when a user has a holder in his or her hand to slidably move a transfer head on the transferred object with the transfer head contacting the surface of the transferred object (for example, refer to a patent document 1)

DISCLOSURE OF THE INVENTION

Problems to be Solved by the Invention

However, according to the conventional transfer tool, in order to carry out the stable transfer operation, the transfer is performed with the transferred object such as paper mounted on a flat face plate such as a desk and a work table, and this generates a defect that a place where the transfer tool can be used is limited. In addition, in order to prevent the desk and the work table or the like from getting dirty when the transfer material such as glue runs off the edge of the transferred object in advance, an underlay may be further mounted on the flat face plate such as the desk or the work table and the transferred object may be mounted thereon. In this case, the work before the transfer material is transferred on the transferred object is troublesome, so that this involves a problem such that the transfer operation cannot be carried out immediately and a practical utility is lacked.

The present invention has been made taking the foregoing problems into consideration and an object of which is to provide a transfer tool that can be preferably used without a table such as a desk and can easily carry out the transfer operation in any places.

Means for Solving Problem

In other words, the present invention may comprise a transfer tool used for transferring a transfer material on a transferred object such as paper, including: a transfer tool main body having a transfer head that can bring at least the transfer material into contact with the transferred object; and a transferred object receiver that is accompanied by the transfer tool main body; wherein the transfer head has a transfer face that is a region contacting the transferred object and transferring the transfer material when transferring the transfer material on the transferred object; an insertion space is formed between the transfer tool main body and the transferred object receiver, in which the transferred object can be inserted; the transfer head is positioned so that at least the transfer face is exposed in the insertion space; and the transfer material is transferred on the transferred object by slidably moving the transfer face to a predetermined transfer direction while bringing the transfer face into contact with the transferred object with the transferred object inserted in the insertion space and the transferred object sandwiched between the transfer tool main body and the transferred object receiver.

In this case, “a transfer direction” means a direction for moving the transfer tool to the transferred object in the case of using the transfer tool with the transferred object sandwiched between the transfer tool main body and the transferred object. According to such a transfer tool, a usage mode that is not applied to the conventional transfer tool, namely, a usage mode that the transfer is carried out with paper sandwiched between the transfer tool main body and the transferred object receiver can be employed. Therefore, it is not necessary to use a board such as a table and a desk on which the transferred object is mounted upon transfer and the transfer tool according to the present invention can easily transfer the transfer material on the transferred object in any times and any places. As a result, it is natural that the work to further mount the underlay on the surface of the table or the like is not needed, so that it is preferable that the transfer operation can be carried out immediately.

Particularly, if the insertion space is continuously opened to three directions, namely, at least a predetermined transfer direction, a reverse transfer direction, and a direction that is orthogonal to the transfer direction and the reverse transfer direction, a specification and a shape of the transferred object that can be transferred are not limited to the inside measure of the insertion space. Therefore, by relatively sliding and moving the transferred object inserted from the reverse transfer direction to the transfer direction with respect to the transfer tool, the present transfer tool can preferably transfer the transfer material on the transferred object having any specifications and any shapes. In addition, since the present transfer tool has such an insertion space, the present transfer tool also can transfer the transfer material on the transferred object by inserting paper into the insertion space that is formed between the transfer tool main body and the transferred object receiver with the transfer tool main body brought close to the transferred object receiver in advance, and sliding and moving the paper to the transfer direction. In this case, the transfer tool can perform the transfer operation more simply since the operation to grasp the transfer tool is not necessary.

Further, if the transfer material is transferred on the transferred object by sliding the transfer face of the transfer head on the surface of the transferred object upon transfer, as compared to the usage mode that a transfer roller is disposed at the transfer head, the configuration of the transfer tool can be effectively simplified and the number of parts thereof can be effectively reduced.

On the other hand, if the transfer head includes a transfer roller having the transfer face that can be rotated upon transfer, it is possible to contact the transferred object and the transfer face more smoothly to improve the transfer property. Particularly, if a first auxiliary roller is provided on the transferred object receiver, which can be rotated in conjunction with the transfer roller upon transfer, it is possible to smoothly carry out the transfer operation with the transferred object sandwiched between the transfer tool main body and the transferred object receiver.

Further, in order to interlock the transfer roller with the first auxiliary roller with a high probability, the first auxiliary roller may be provided at a position opposed to the transfer roller. In addition, if the first auxiliary roller has a backing face that is a region that can be opposed to the transfer face and can contact the rear face of the transferred object upon transfer and the backing face and the transfer face are relatively connected and separated each other, the backing face and the transfer face are relatively contacted and separated in response to the thickness of the transferred object to be transferred upon transfer, it is possible to bring the backing face and the transfer face into contact with the front surface and the rear surface of the transferred object, respectively, and bite into the transferred object is improved. As a specific embodiment, the embodiment that the transferred object receiver includes a base and at least the first auxiliary roller, and further includes an arm portion that can carry out the balancing operation with respect to the base and the embodiment that the first auxiliary roller cradle supporting a rotational support shaft of the first auxiliary roller is configured so as to be elastically deformed in a direction connecting and separating to and from the transfer head are conceivable. In addition, if the first auxiliary roller is formed by a cushion material that is elastically deformed at least in a direction connecting and separating to and from the transfer head, these advantages can be more effective.

In addition, if a pair and more of second auxiliary rollers is provided, which are opposed at the side of the transfer tool main body and the side of the transferred object receiver at a position in the insertion space that is different from the opposed position of the transfer roller and the first auxiliary roller, the transferred object is closely related to the transfer tool in at least two places within the insertion space. As a result, it is possible to smoothly move the transferred object and a straight through property to the transferred object of the transfer tool can be effectively improved.

Further, in order to more smoothly move the transferred object on the transferred object, a first endless track mechanism winding a crawler track between at least one of the second auxiliary roller and the transfer roller may be provided with the transfer tool main body. In addition, if a second endless track mechanism winding a crawler track between at least one of the second auxiliary roller and the first auxiliary roller is provided at the transferred object receiver, the transfer operation can be carried out smoothly with a stable state. Particularly, as the embodiment that can adjust the second auxiliary rollers opposed with each other flexibly in response to the thickness of the like of the transferred object, the embodiment that the transferred object receiver includes a base and at least one of the second auxiliary roller and further includes an arm portion that can carry out the balancing operation with respect to the base or the embodiment that the transferred object receiver includes at least one of the second auxiliary roller and a second auxiliary roller cradle supporting a rotational support shaft of the second auxiliary roller is configured so as to be elastically deformed in a direction connecting and separating to and from the other second auxiliary roller that is provided with the transfer tool main body so as to be opposed to the one second auxiliary roller are conceivable.

Further, if the transferred object receiver is configured so as to be relatively movable with respect to the transfer tool main body between a transfer head covered position where the front end portion of the transfer head can be covered and a transfer head exposed position where the front end portion of the transfer head is exposed, in the case that the transferred object receiver is set at the transfer head exposed position, the present transfer tool can be used in the same way as the known transfer tool, namely, without sandwiching the transferred object between the transfer tool main body and the transferred object receiver. Therefore, by appropriately changing the usage mode depending on the application, the present transfer tool becomes more practical.

Specifically, the embodiment provided with a slidably moving mechanism which relatively moves the transferred object receiver between the transfer head covered position and the transfer head exposed position by slidably moving the transferred object receiver in the transfer direction or in the reverse transfer direction with respect to the transfer tool main body is available. As the embodiment of the slidably moving mechanism with a simple structure that can locate the cradle at the transfer head exposed position or at the transfer head covered position by the simple operation, the embodiment that the slidably moving mechanism is configured by a shaft provided at the transfer tool main body and a bearing portion formed on the transferred object receiver so as to support the shaft; a groove is formed on the bearing portion, in which the shaft can be inserted and which is elongated in the transfer direction or in the reverse transfer direction; and the transferred object receiver is configured so as to be slidabely movable with respect to the transfer tool main body between the transfer head covered position and the transfer head exposed position by slidably moving the shaft along the elongated direction of the groove is available.

In addition, as the other specific embodiment, the embodiment including a rotatably moving mechanism which relatively moves the transferred object receiver between the transfer head covered position and the transfer head exposed position by rotatably moving the transferred object receiver in a predetermined direction with respect to the transfer tool main body is conceivable. In this case, if the rotatably moving mechanism is configured by a shaft provided at the transfer tool main body and a bearing portion formed on the transferred object receiver so as to rotatably support the shaft; and the transferred object receiver is configured so as to be rotatably movable with respect to the transfer tool main body between the transfer head covered position and the transfer head exposed position using a pivoting point between the shaft and the bearing portion as a support point, by rotatably clearing the transferred object receiver located at the transfer head covered position, the transferred object receiver is located at the transfer head exposed position with the simple operation.

In addition, if regulating means is provided, which prevents the transfer tool main body and the transferred object receiver from moving close each other for a predetermined distance or more upon transfer, it is possible to prevent so-called bite and deformation and damage of a member that may occur when the transfer tool main body comes close to the transferred object receiver beyond necessity. As the specific embodiment of the regulating means, the embodiment that the regulating means uses an elongated chip that is provided at any one of the transfer tool main body or the transferred object receiver and is elongated to the other one; and the elongated chip abuts against the other one by priority when transferring the transfer material on the transferred object is conceivable. According to such a transfer tool, by using the simple structure, it is possible to surely prevent the transfer tool main body and the transferred object receiver from coming close to each other beyond necessity.

Further, if guide means is provided, which can abut against the edge portion of the transferred object when the transferred object is inserted in the insertion space and the transferred object is guided by this guide means so as to be movable in the insertion space, by abutting the edge of the transferred object against the guide means, the dimension of the insertion depth of the transferred object with respect to the transfer tool is made constant, so that it is possible to perform transfer approximately in parallel with the edge of the transferred object. As the specific embodiment of the guide means, the embodiment the guide means uses an elongated chip that is provided at any one of the transfer tool main body or the transferred object receiver and is elongated to the other one is available.

In addition, regulating means may be provided, which prevents the transfer tool main body and the transferred object receiver from moving close each other for a predetermined distance or more upon transfer; the regulating means may function as the guide means that can abut against the edge portion of the transferred object when the transferred object is inserted in the insertion space. Further, the regulating means may use an elongated chip that is provided at any one of the transfer tool main body or the transferred object receiver and is elongated to the other one; the elongated chip may abut against the other one by priority when transferring the transfer material on the transferred object. If the guide means uses the elongated chip, the regulating means and the guide means can be realized by using one member. Therefore, as compared to the embodiment that the regulating means and the guide means are configured by using separate members respectively, the number of the parts can be effectively reduced.

Particularly, if the elongated chip can close one side along the transfer direction, it is possible to keep the dimension for sandwiching the transferred object and the dimension of the insertion depth of the transferred object into the insertion space constant.

In addition, if a shaft to rotatably support the transferred object receiver with respect to the transfer tool main body is firmly fixed to the transfer tool main body; a pair of opposed edge portions is formed on the shaft, which are located approximately in parallel with each other at least seen from the side and are elongated along the elongated direction of the transferred object receiver; the initial state is set so that these opposed edge portions are different from the transfer direction; an elastically deforming part is provided, in which a bearing portion for inserting the shaft is formed at the transferred object receiver and an opening portion having the approximately same opening dimension as the distance between the opposed edge portions of the shaft is formed; the shaft is inserted in a region where the opening portion and the bearing portion are communicated in the initial state; when the elastically deforming parties are configured to accumulate a urging force to urge the transferred object receiver to a direction to separate the transferred object receiver from the transfer tool main body, by elastically deforming the elastically deforming part due to the pressure welding force between the opposed edge portion and the inside portion of the opening portion, during the process of rotating the transferred object receiver in a direction closing to the transfer tool main body centering around the shaft from the initial state that the opposed edge portion and the inside portion of the opening portion are welded with pressure, unless the operational force is given in a direction of bringing the transferred object receiver close to the transfer tool main body, the transferred object receiver is located at the initial state and the pair of opposed edges of the axis is welded with pressure to the inner face of the opening. Therefore, idle is difficult to generate and the assembling state of the transfer tool main body and the transferred object receiver can be improved.

In addition, in order to prevent the defect that the track of transfer which is generated when a user turns his or her wrist upon transfer is shaped in a curve and to improve the straight through property upon transfer, an inward face located at least the side of the insertion space of the elongated chip and a first virtual standing face that is a virtual standing face passing through the transfer face may form a blunt angle opening to the transfer direction. As the specific embodiment, the embodiment that making the first virtual standing face to be orthogonal to the transfer direction, the inward face and the first virtual standing face are set to form the blunt angle opening to the transfer direction is considerable. In this case, if the elongated chip is provided at the transfer tool main body, and the outside wall of the transfer tool main body is set to be located approximately in parallel with the inward face, at least transfer tool main body is located approximately in parallel with the edge of the transferred object from appearance, with the transferred object sandwiched between the transfer tool main body and the transferred object receiver, so that even in the case that the inward face is inclined against the first virtual standing face for a predetermine angle, the user can perform the transfer operation without uncomfortable feeling. In addition, as the other specific embodiment, the one that the inward face is set so as to be located in parallel with a second virtual standing face that is a virtual face standing along the transfer direction, and the inward face and the first virtual standing face forms a blunt angle opening to the transfer direction is available.

Effect of the Invention

As described above, according to the present invention, since it is possible to use the transfer tool in the innovative and unconventional embodiment such that the transfer is carried out with the transferred object such as paper sandwiched between the transfer tool main body and the transferred object receiver, a board such as a table and a desk on which the transferred object is put are not needed and the transfer can be easily carried out in any places. As a result, the operation to further mount the underlay on the surface of the table or the like is naturally unnecessary, so that the transfer operation can be immediately performed and this improves the practical utility of the present transfer tool. In addition, since the insertion space is continuously opened in three directions, namely, a predetermined transfer direction, a reverse transfer direction, and a direction orthogonal to the transfer direction and the reverse transfer direction, the specification and the shape of the transferred object that can be transferred are not limited to the inside measure of the insertion space. Therefore, by transferring the transferred object inserted from the reverse transfer directional side to the transfer directional side, the transfer can be preferably made on the transferred object with any specification and any shape. Further, the present transfer tool also can transfer the transfer material on the transferred object by inserting the transferred object in the insertion space formed between the transfer tool main body and the transferred object receiver with the transfer tool main body brought close to the transferred object receiver in advance, and sliding and moving the transferred object to the transfer direction. It is preferable that the present transfer tool can be applied to various usage modes depending on the application.

BEST MODE FOR CARRYING OUT THE INVENTION

An embodiment of the present invention will be described below with reference to the drawings.

Figure 1:
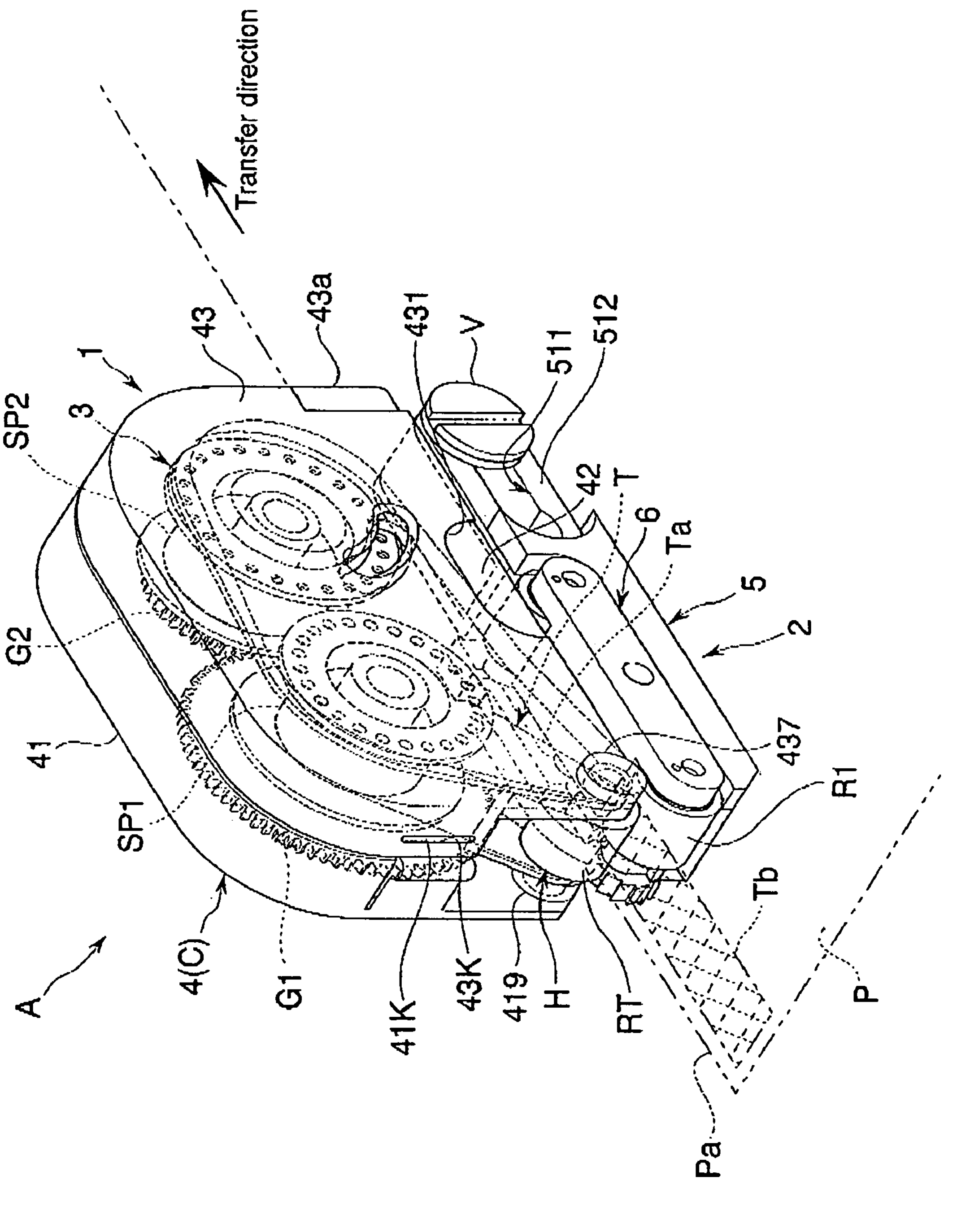
FIG. 1 is an entire perspective view of a transfer tool according to an embodiment of the present invention.
Figure 2:
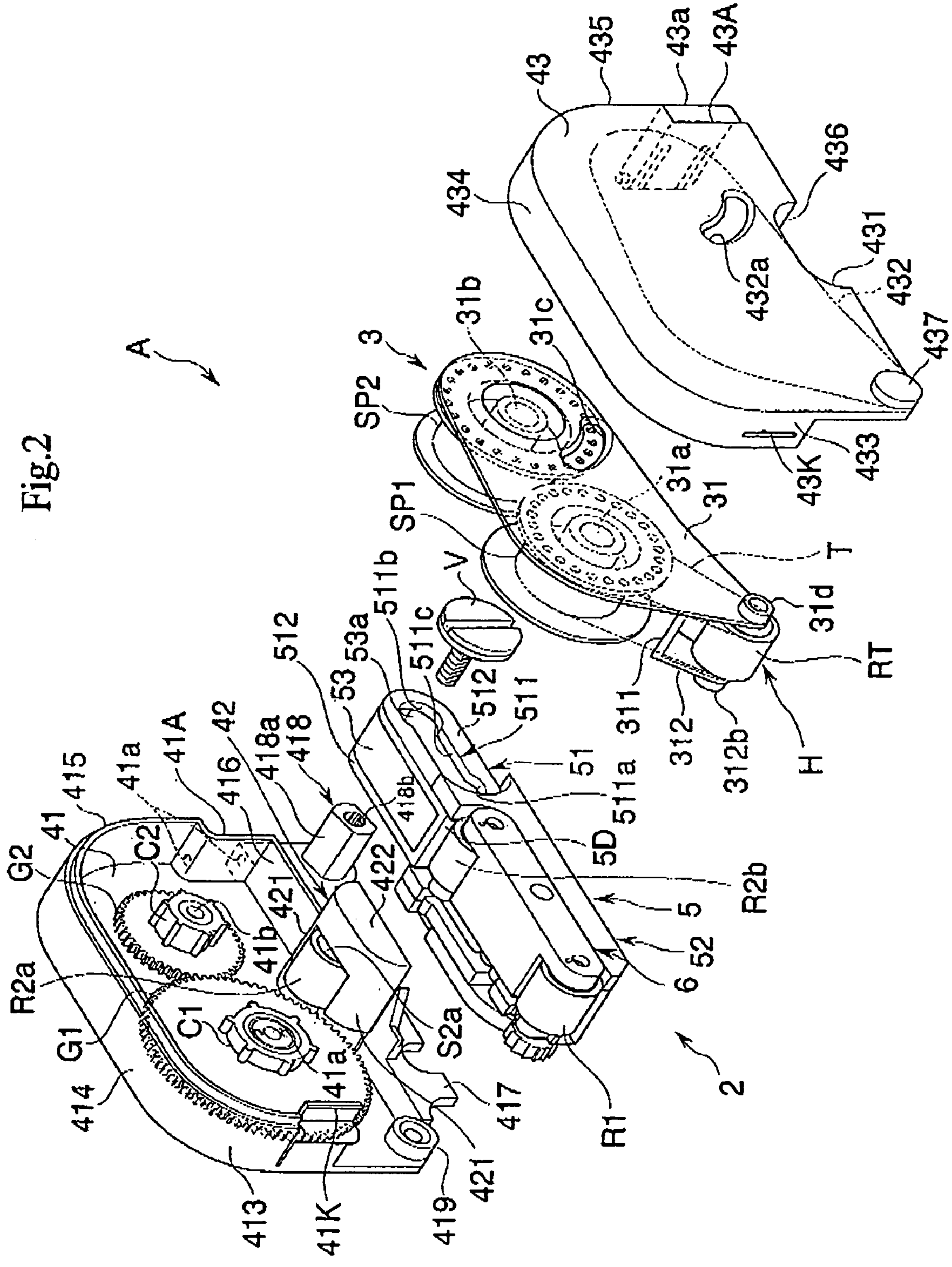
FIG. 2 is an exploded perspective view of the transfer tool according to the embodiment.

For example, as shown in FIG. 1 and FIG. 2 or the like, a transfer tool A according to the present embodiment may transfer a tape glue T that is an transfer material made of a tape main body Ta and a glue Tb pasted on one side of this tape main body Ta on a paper slip P that is a transferred object.

The transfer tool A is mainly provided with a transfer tool main body 1 having a transfer head H that can hold the tape glue T and can contact the tape glue T with the paper slip P and a transferred object receiver 2 accompanied by this transfer tool main body 1. Further, in the following description, a word "forth" indicating a position or a direction indicates the side where the transfer head H of the transfer tool A is located, and a word "back" indicates the opposite side of the side where the transfer head H is located in a longitudinal direction of the transfer tool A. In addition, a word "back and forth direction" indicates the longitudinal direction of the transfer tool A. Further, a word "upper" indicates the side where the transfer tool main body 1 is located in the transfer tool A, and a word "lower" indicates the side where the transferred object receiver 2 is located in the transfer tool A.

The transfer tool main body 1 is mainly provided with a refill cartridge 3 holding the tape glue T and a case 4 detachably housing this refill cartridge 3 therein.

Figure 3:
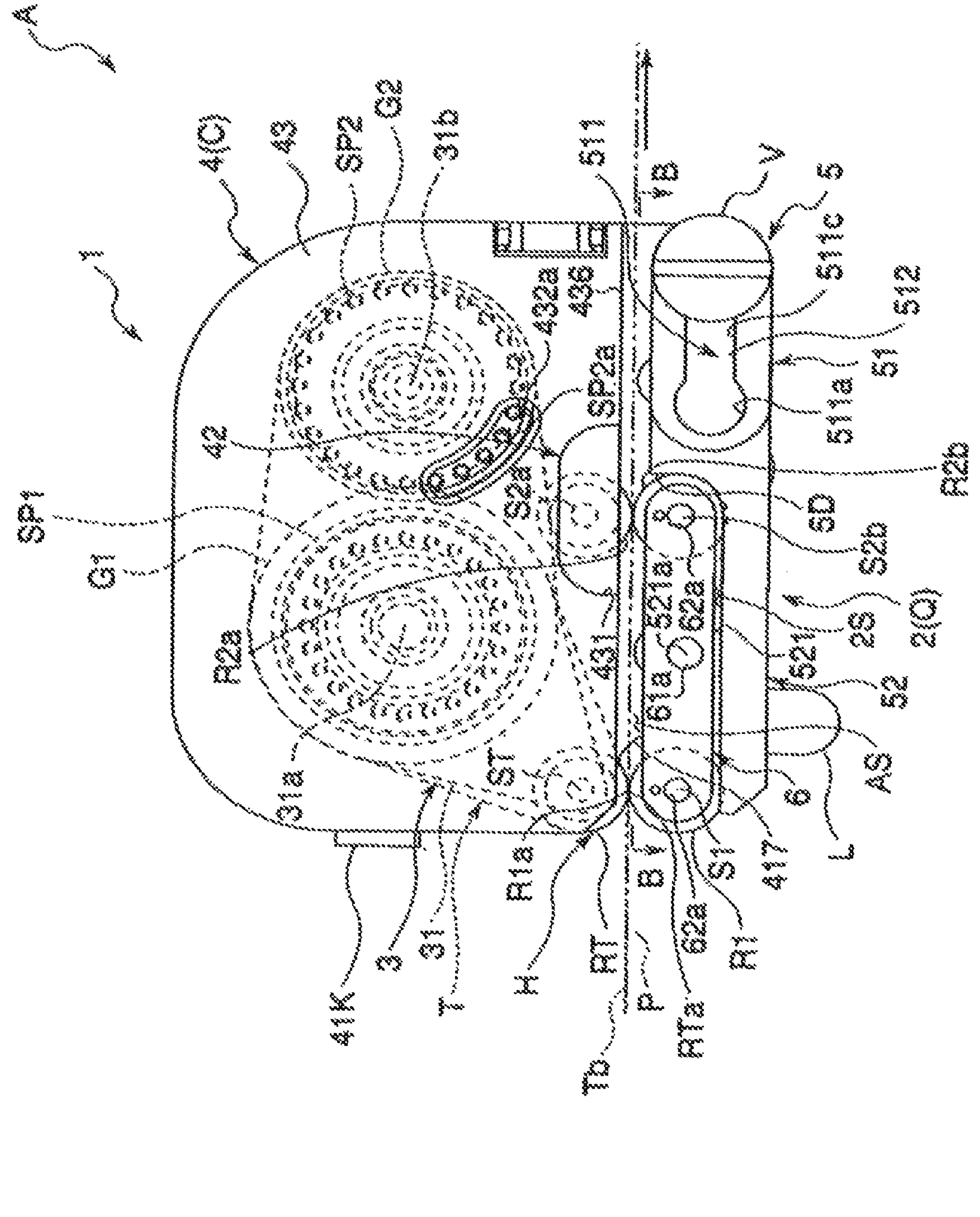
FIG. 3 is a schematic side view with partially omitted showing the transfer tool according to the embodiment.
Figure 4:
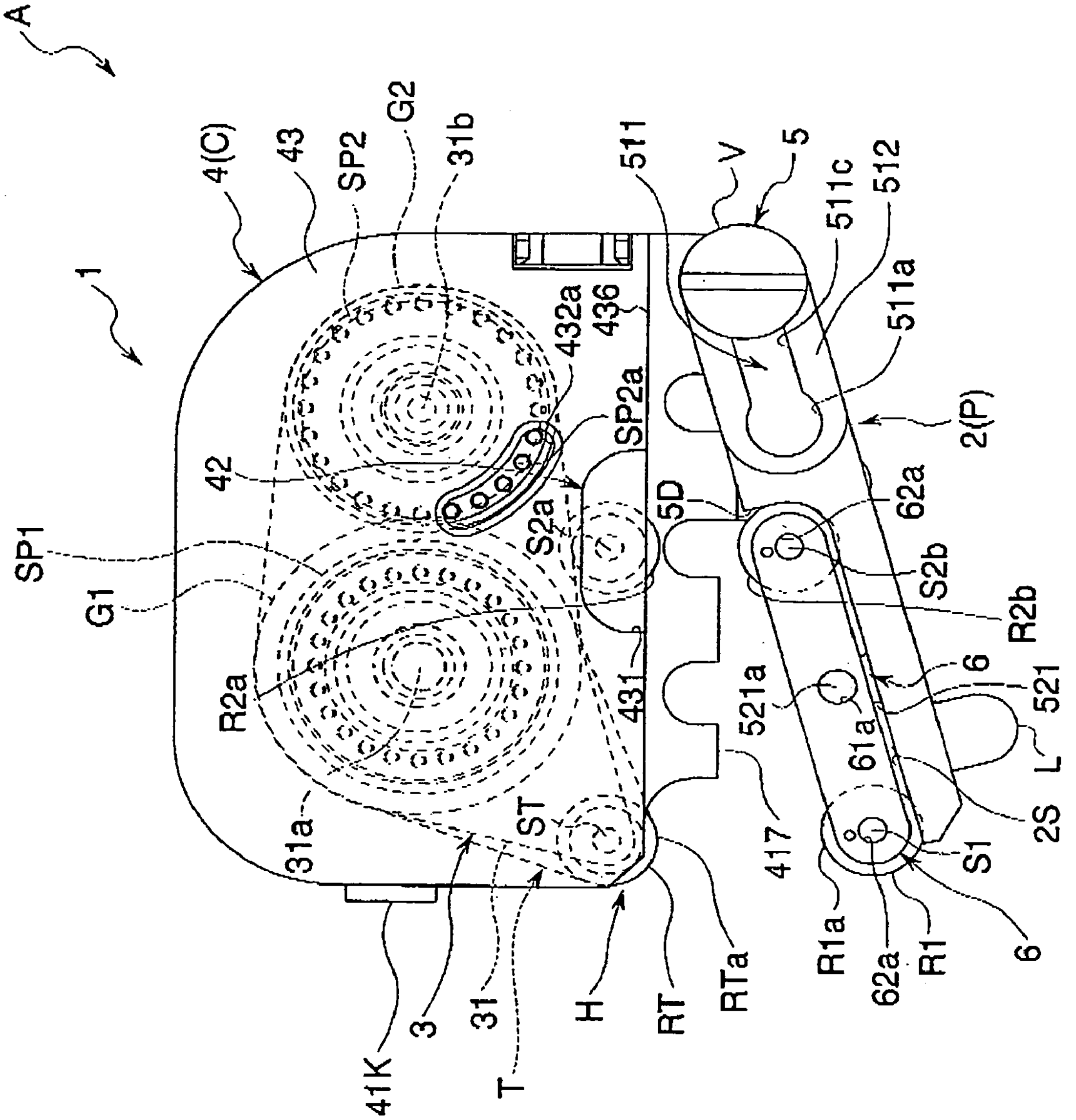
FIG. 4 is a schematic side view with partially omitted showing the transfer tool according to the embodiment.

As shown in FIGS. 2 to 4 (FIG. 3 is a schematic side view with partially omitted showing the transfer tool when the transferred object receiver is located at a using position to be described later, and FIG. 4 is a schematic side view with partially omitted showing the transfer tool when the transferred object receiver is located at an unused position to be described later) or the like, the refill cartridge 3 is mainly configured by an inside plate 31 that rotatably supports a winding off spool SP1 and a rolling up spool SP2, respectively. At a front end portion of this inside plate 31, the transfer head H is rotatably supported.

The inside plate 31 is made of, for example, a thin plate made of a synthetic resin, and according to the present embodiment, it is assumed that the inside plate 31 is formed in the shape of an substantially egg seen from the side, front end side of which is elongated obliquely downward. Each of the winding off spool SP1 and the rolling up spool SP2 is shaped in a substantially tubular form and guard portions are integrally provided at the both ends thereof, and a through hole is formed along axial direction. Then, by inserting shafts 31*a* and 31*b* protruded in a direction orthogonal to the inside plate 31 from the approximately center part in the back and forth direction and the rear end side of the inside plate 31 into the through holes of respective spools SP1 and SP2, respectively, respective spools SP1 and SP2 are attached to the inside plate 31 so that they cannot be detached from the inside plate 31. Thus, the winding off spool SP1 and the rolling up spool SP2 are supported by the inside plate 31 like a cantilever. Further, a concavo-convex portion shaped in a saw teeth seen from a flat surface (not illustrated) is provided at the opposite position of the rolling up spool SP2 of the inside plate 31, and a nail portion (not illustrated) protruded in a direction orthogonal to the inside plate 31 is provided at the guard portion of the rolling up spool SP2. Then, due to the engagement between the concavo-convex portion and the nail portion, the rolling up spool SP2 is set so as to be rotated only in one direction. In other words, by the concavo-convex portion and the nail portion, a reverse rotation preventing mechanism (ratchet) for preventing the reverse rotation of the rolling up spool SP2 is configured. It is obvious that the concavo-convex portion may be formed at the region opposed to the winding off spool SP1 of the inside plate 31, and in relation to this concavo-convex portion, the nail portion may be provided at the guard portion of the winding off spool SP1 so as to prevent the reverse rotation of the winding off spool SP1. In addition, at the region where the concavo-convex portion is attached in the rolling up spool SP2, a slit 31*c* shaped in a partial arc seen from the side is formed.

The transfer head H has a transfer roller RT that can be rotated upon transfer on the paper slip P of the tape glue T. This transfer roller RT is formed by a cushion material that can be elastically deformed a little by the externally applied force. Then, in the vicinity of the front end portion of the inside plate 31, an orthogonal chip 311 elongated by a predetermined dimension in a direction orthogonal to the inside plate 31 and a parallel chip 312 elongated from the front end portion of this orthogonal chip 311 approximately in parallel with the inside plate 31 are integrally provided. By inserting the side end portions of a rotational support shaft ST into the through holes formed at the front end portion of this parallel chip 312 and at a predetermined region of the inside plate 31 opposed to the front end portion of the parallel chip 312, respectively, the transfer roller RT is set so as to be rotated around the rotational support shaft ST. Here, according to the present embodiment, the front end portion of the transfer head H indicates the front end portion of a transfer face RTa that is a region contacting the paper slip P upon transfer that transfers the tape glue T in the transfer roller RT. This transfer face RTa can be rotated upon transfer. In addition, at the front end portion of the parallel chip 312 and the predetermined region of the inside plate 31 opposed to the front end portion of the parallel chip 312, tubular portions 312*b* and 31*d* are provided, that are evaginated toward the outside direction respectively, and these tubular portions 312*b* and 31*d* are set so as to be fit in fitting portions 419 and 437 formed on respective outside plates 41 and 43 to be described later, respectively. Further, according to the present embodiment, these tubular portions 312*b* and 31*d* are provided so as to be related to the through holes where the side end portions of the rotational support shaft ST can be inserted, respectively.

On the other hand, as shown in FIGS. 2 to 4, the case 4 is mainly provided with a first outside plate 41 that is one outside wall of the transfer tool main body 1 and a second outside plate 43 opposed to this first outside plate 41 that is the other outside wall of the transfer tool main body 1.

Figure 5:
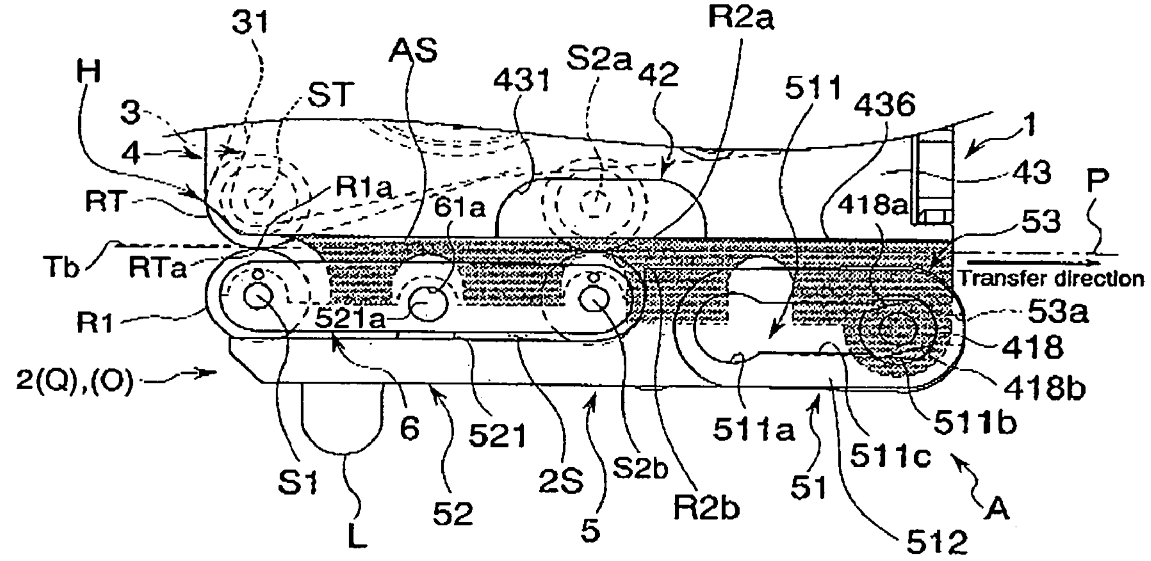
FIG. 5*a* is an operational explanatory view showing one embodiment of the transferred object receiver located at a using position.
FIG. 5*b* is an operational explanatory view showing one embodiment of the transferred object receiver at an unused position.
Figure 5:
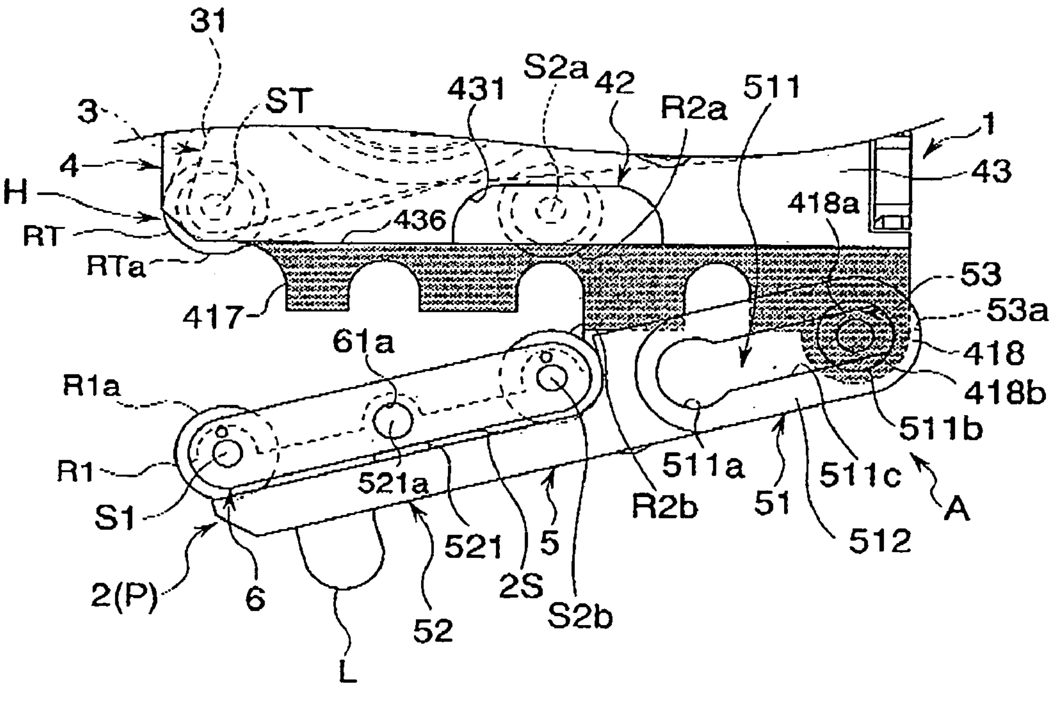

As same as the first inside plate 31, the first outside plate 41 is shaped in a thin plate, for example, made of a synthetic resin, and according to the present embodiment, the first outside plate 41 is shaped in an approximately rectangle seen from the side with a rounded corner. On the inside of this first outside plate 41, a winding off gear G1 for rotatably driving the winding off spool SP1 and the rolling up spool SP2 and a rolling up gear G2 having a smaller diameter than that of the winding off gear G1 and being engaged with the winding off gear G1 are formed so as to be attached thereon. The winding off gear G1 is attached on the inside face of the first outside plate 41 by inserting a shaft 41*a* formed slightly forward from the approximately center part in the back and forth direction of the first outside plate 41 into a through hole formed on the center part of the winding off gear G1 and then, attaching a core C1 to this shaft 41*a* so as not to fall therefrom. On the other hand, the rolling up gear G2 integrally has a core C2 and the rolling up gear G2 is attached on the inside face of the first outside plate 41 so as not to fall therefrom by inserting a shaft 41*b* formed at the rear end side of the first outside plate 41 into a through hole formed on the center part of the rolling up gear G2. Then, when the refill cartridge 3 is mounted on the case 4, the outer circumference of the core C1 is engaged with the inner circumference of the winding off spool SP1 and the outer circumference of the core C2 is engaged with the inner circumference of the rolling up spool SP2. In addition, a front periphery portion 413, an upper periphery portion 414, a rear periphery portion 415, and a lower periphery portion 416 are continuously and integrally provided, that are elongated in a direction approximately orthogonal to the first outside plate 41 from the region except for the lower end portion at the front edge and the front end portion at the lower edge in the periphery of the first outside plate 41. Further, a part of the lower periphery portion 416 is set discontinuously and at this region, a second auxiliary roller R2*a* of the present invention is attached via a fixing member 42 shaped in an approximately house shoe seen from the plane face. The fixing member 42 is integrally molded provided with a pair of opposing chips 421 and a couple chip 422 with the end portions of these opposed chips 421 continued (refer to FIG. 2), and by inserting a projection portion (not illustrated) protruded from the other end portion of each opposed chip 421 into an inserted concave portion (not illustrated) formed on the first outside plate 41, the fixing member 42 is firmly fixed on the first outside plate 41. Insertion holes are formed so as to be opposed mutually on the couple chip 422 of this fixing member 42 and the first outside plate 41 and the side end portions of a rotational support shaft S2*a* of the second auxiliary roller R2*a* are inserted into these insertion holes, respectively so as to set the second auxiliary roller R2*a* rotatably around the rotational support shaft S2*a*. As same as the transfer roller RT, this second auxiliary roller R2*a* is formed by a cushion material that can be elastically deformed a little by the force added from the outside. In addition, on the first outside plate 41, an elongated chip 417 elongated further downward of the lower periphery portion 416 is integrally provided (refer to FIG. 5. FIG. 5(*a*) shows a substantial part of FIG. 3, and FIG. 5(*b*) shows the substantial part of FIG. 4. In FIG. 5, the elongated chip 417 is represented with a pattern and a screw V to be described later is omitted). Then, with the transfer tool main body 1 and the transferred object receiver 2 brought close with each other, in order to prevent a first auxiliary roller R1 and a second auxiliary roller R2*b* provided on the transferred object receiver 2 (to be described later) and the elongated chip 417 from interfering each other, more specifically, in order to prevent rotational support shafts S1 and S2*b* of respective rollers R1 and R2 and the elongated chip 417 from interfering each other, the regions corresponding to respective auxiliary rollers R1 and R2*b* at the elongated chip 417 (respective rotational support shafts S1 and S2*b*) are cut in an approximately partial arc seen from the side. Therefore, an edge Pa of the paper slip P can approximately coincide with the edge of the glue Tb. In addition, at the rear end portion of the elongated chip 417, a shaft 418 that is protruded in a direction orthogonal to the elongated direction of the elongated chip 417 is provided (refer to FIG. 2 and FIG. 5). This shaft 418 is formed in an approximately column shape and is formed in an approximately ellipse coin shape seen from the side with an upper edge portion 418*a* and a lower edge portion 418*b* seen from the side cut approximately parallel. These upper edge portion 418*a* and lower edge portion 418*b* are the opposed edge portions of the present invention that are formed approximately in parallel with each other seen from the side. Thereby, a distance between the upper edge portion 418*a* and the lower edge portion 418*b*, namely, a height dimension between the upper edge portion 418*a* and the lower edge portion 418*b* of the shaft 418 seen from the side are set to be smaller than the diameter of the shaft 418. Further, the elongated direction of the upper edge portion 418*a* and the lower edge portion 418*b* of the shaft 418 is set differently from the transfer direction. According to the present embodiment, the lower periphery portion 416 of the first outside plate 41 approximately in parallel with the transfer direction and the upper edge portion 418*a* and the lower edge portion 418*b* of the shaft 418 are set to be directed forward (the direction of the reverse transfer) at about 15 degrees. Further, according to the present embodiment, this shaft 418 is integrally provided on the elongated chip 417, however, the shaft that is a different member from the elongated chip 417 may be integrally attached to the elongated chip 417. In addition, a concave portion 41A made by caving a part of a rear edge region of the first outside plate 41 toward the front side is formed, and an engaging hole 41*a* with which an engaging chip 43*a* disposed on a second outside plate 43 to be described later is engaged is formed on the concave portion 41A (refer to FIG. 2). Further, at the lower edge side at the front end portion of the first outside plate 41, a fitting portion 419 evaginated toward the inside direction is provided. This fitting portion 419 is formed so as to be fit the inner circumference and the outer circumference of the tubular portion 312*b* provided on the inside plate 31 at the same time. In addition, at the lower edge side of the front periphery portion 413, a latching chip 41K shaped in a fish hook that is protruded toward a direction orthogonal to the first outside plate 41 is provided, and this latching chip 41K and a latching hole 43K formed at the second outside plate 43 to be described later are set so as to be latched each other.

On the other hand, the second outside plate 43 is formed in a thin plate, for example, made of a synthetic resin as same as the first outside plate 41. The shape seen from the side of the second outside plate 43 is set so as to approximately correspond to the shape seen from the side of the first outside plate 41, and a notch 431 that is formed in approximately same shape as the shaped seen from the side of the fixing member 42 is formed on the approximately center part of the lower end portion in order to avoid the interference with the fixing member 42 provided on the first outside plate 41. On a predetermined area that the outside face of the inside plate 31 of the refill cartridge 3 on the inside face of the second outside plate 43 can abut against or can be brought close to, a fitting concave portion 432 concaved on the outside face side so as to be thinner than the other area is formed approximately corresponding to the shape seen from the side of the inside plate 31 (refer to FIG. 2). Thereby, it is possible to easily determine the position of the inside plate 31 with respect to the second outside plate 43 of the inside plate 31. Forming a slit 432*a* shaped in a partial arc seen from the side on this fitting concave portion 432, the refill cartridge 3 is attached in the case 4. In this state, if the rolling up spool SP2 is rotated inserting an appropriate tool having a sharp region at its front end portion such as a driver and a pen or a writing material or the like in a concave portion SP2*a* intermittently provided along a circumferential direction on the outside face of the rolling up spool SP2 from this slit 432*a* and the slit 31*c* formed on the inside plate 31, in accordance with this, the winding off spool SP1 is also rotated in conjunction with this, so that loose of the tape glue T including the tape main body Ta in the transfer tool main body 1 can be adjusted. In addition, in the periphery of the second outside plate 43, a front periphery portion 433, an upper periphery portion 434, a rear periphery portion 435, and a lower periphery portion 436 elongated from the region except for the lower end portion at the front edge and the front end portion at the lower edge to a direction approximately orthogonal to the second outside plate 43 are continuously and integrally provided. Further, at the position corresponding to the fitting portion 419 provided at the first outside plate 41, namely, at the lower edge side at the front end portion of the second outside plate 43, a fitting portion 437 evaginated toward the outside direction is provided. This fitting portion 437 is formed so as to be fit the inner circumference and the outer circumference of the tubular portion 31*d* provided on the inside plate 31 of the refill cartridge 3 at the same time. In addition, a concave portion 43A concaved in the front end side is also formed on one end at the rear edge region of the second outside plate 43 corresponding to the concave portion 41A formed on the first outside plate 41, and on this concave portion 43A, the engaging chip 43*a* that is protruded toward the same direction as the rear periphery portion 435, namely, a direction orthogonal to the second outside plate 43 and is engaged with the engaging hole 41*a* formed on the concave portion 41A of the first outside plate 41 is provided.

Then, in order to integrally assemble the first outside plate 41 and the second outside plate 43 having such configurations, the engaging chip 43*a* of the second outside plate 43 is engaged with the engaging hole 41*a* of the first outside plate 41. Thereby, the engagement region of the engaging chip 43*a* and the engaging hole 41*a* functions as a hinge mechanism, and the first outside plate 41 and the second outside plate 43 are set so as to relatively rotate using this engaging regions as a supporting point. Thus, the case made by integrally assembling the outside plates 41 and 43 is set so as to rotate between a closing position (C) that approximately closes the space between the first outside plate 41 and the second outside plate 43 by abutting or closing respective periphery portions 413, 414, 415, and 416 of the first outside plate 41 against or to respective periphery portions 433, 434, 435, and 436 of the second outside plate 43 and a release position (not illustrated) where the first outside plate 41 and the second outside plate 43 are located approximately linearly and respective inside spaces are released. Further, if the case is set at the closing position (C), due to engagement of an engaging hole 43K formed at the front periphery portion 433 of the second outside plate 43 and the latching chip 41K provided at the first outside plate 41, the first outside plate 41 and the second outside plate 43 are engaged with each other. Thus, by the latching chip 41K and the latching hole 43K corresponding to this latching chip 41K, latching means for latching the first outside plate 41 and the second outside plate 43 each other at the closing position (C) is configured.

Next, the procedure to attach the refill cartridge 3 in the case 4 made by assembling the first outside plate 41 and the second outside plate 43 having such a structure will be described. At first, by using the hinge mechanism formed by engaging the engaging chip 43*a* with the engaging hole 41*a* in advance, the first outside plate 41 and the second outside plate 43 that are assembled so as to be rotatable relatively are set at the release position. Then, the refill cartridge 3 is fitted in the first outside plate 41 so as to engage the inner circumference of the winding off spool SP1 and the outer circumference of the core C1 and to engage the inner circumference of the rolling up spool SP2 and the outer circumference of the core C2. Thereby, the tubular portion 312*b* provided on the parallel chip 312 of the refill cartridge 3 and the fitting portion 419 provided on the first outside plate 41 are fitted each other. Next, in accordance with the operation for rotating the first outside plate 41 and the second outside plate 43 from the release position to the closing position (C), the tubular portion 31*d* provided on the inside plate 31 of the refill cartridge 3 and the fitting portion 437 provided on the second outside plate 43 are fitted each other, and the outside face of the inside plate 31 is fitted in the fitting concave portion 432 formed on the second outside plate 43 abutting against it or near it, so that the refill cartridge 3 is stably held between the first outside plate 41 and the second outside plate 43. In this assembling state, the front end portion of the transfer head H, namely, the transfer face RTa of the transfer roller RT and the lower end portion of the second auxiliary roller R2*a* are set so as to be located further below of the lower periphery portions 416 and 436 of the first outside plate 41 and the second outside plate 43 (refer to FIGS. 3 to 5).

On the other hand, the transferred object receiver 2 is mainly provided with a base 5 having a bearing portion 511 formed so as to support the shaft 418 that is disposed on the elongated chip 417 of the first outside plate 41 and an arm portion 6 set to be capable of performing the balancing operation with respect to the base 5.

The base 5 is set so that its back and forth width dimension is slightly shorter than that of the transfer tool main body 1 and a step portion 5D is formed at the approximately center part in the back and forth direction so that the height dimension of the area ranging from the approximately center part in the back and forth direction to the front end portion is smaller than that of the area ranging from the approximately center part in the back and forth direction to the rear end portion. In the following description, the region at the rear end side from this step portion 5D is referred to as a posterior portion 51, and the region at the front end side from this step portion 5D is referred to as an anterior portion 52. On the posterior portion 51, the bearing portion 511 is formed.

This bearing portion 511 has a first large diameter part 511*a* and a second large diameter part 511*b* having slightly larger diameters than that of the shaft 418 at the regions that are separated at a predetermined distance in the back and forward direction, and has a groove 511*c* elongated in the back and forward direction so as to communicate these diameter parts 511*a* and 511*b* with each other. The shaft 418 can be inserted through the groove 511*c*. According to the present embodiment, the height dimension of the groove 511*c* is set to be slightly larger than the height dimension between the upper edge portion 418*a* and the lower edge portion 418*b* of the shaft 418 seen from the side (namely, the distance between the upper edge portion 418*a* and the lower edge portion 418*b*) and be slightly smaller than the diameter of the shaft 418 (refer to FIG. 5). Then, corresponding this bearing portion 511 to the formed region, a space of a predetermined width dimension is formed between exterior wall parts 512 configuring the opposite exterior walls at the posterior portion 51 of the base 5. In this space, an elastic member 53 is attached not to be detachable, which has an opening portion 53 the shape of which shape seen from the side approximately coincides with the shape of the posterior part 51 seen from the side, the shape of which is approximately the same as that of the bearing portion 511 (refer to FIG. 2 and FIG. 5). At the elastic member 53, a part of the rear end portion is separated and the opening portion 53*a* is formed in the approximately U shape seen from the side opened backward. Only the front end portion of this elastic member 53 is firmly fixed on the base 5, so that the regions other than the front portion are elastically deformed a little by the force given from the outside. In the opening portion 53*a* of this elastic member 53, the front end portion and the center part approximately coincide with the first large diameter parts 511*a* and the groove 511*c* and the rear end portion has an opening dimension that approximately coincides with that of the groove 511*c*, so that the rear end portion of the elastic member 53 is exposed in the second large diameter part 511*b* as seen from the side (refer to FIG. 5 and FIG. 7 to be described later). In addition, providing a protrusion portion 521 protruding upward at the approximately center part in the back and forth direction of the anterior portion 52, and at the front end portion of this protrusion portion 521, a pair of convex portions 521*a* are formed in a circular form seen from the side that are protruded outside, respectively.

The arm portion 6 is arranged in the anterior portion 5 of the base 5 to form a fitting hole 61*a* into which a convex portion 521*a* provided at the anterior portion 52 of the base is fitted. In addition, the first auxiliary roller R1 that can rotate in conjunction with the transfer roller RT upon transfer is provided at the front end portion of the arm portion 6, and the second auxiliary roller R2*b* that can rotate in conjunction with the second auxiliary roller R2*a* that is provided on the transfer tool main body 1 upon transfer is provided at the rear end portion of the arm portion 6. Specifically, by inserting the side end portions of the rotational support shafts S1 and S2*b* of the first auxiliary roller R1 and the second auxiliary roller R2*b* into a pair of insertion holes 62*a* formed at predetermined regions at the front end portion and the rear end portions of the arm portion 6, respectively, the first auxiliary roller R1 and the second auxiliary roller R2*b* are set to be rotatable around the rotational support shafts S1 and S2*b*. These first auxiliary roller R1 and the second auxiliary roller R2*b* are formed by a cushion material that can be elastically deformed, and the upper edge portions of respective rollers R1 and R2 are set to be located upward from the upper edge of the arm portion 6. By fitting the convex portion 521*a* provided at the protrusion portion 521 of the base 5 in the fitting hole 61*a* formed at the arm portion 6, the arm portion 6 and the base 5 are integrally assembled. In this assembling state, a gap 2S with a predetermined height dimension is formed between the lower edge of the arm portion 6 and the upper edge at the anterior portion 52 of the base 5 (refer to FIG. 3 or the like), and the arm portion 6 is made to be capable of performing the balancing operation with respect to the base 5 using the fitting region of the convex portion 521*a* and the fitting hole 61*a* as a supporting point. Then, in the case that the arm portion 6 is located so as to be approximately in parallel with the base portion 5, the arm portion 6 and the base 5 are set so that the upper edge of the arm portion 6 approximately coincides with the upper edge of the posterior portion 51 of the base 5. Further, on the transferred object receiver 2 according to the present embodiment, an operation lever L that can rotate the first auxiliary roller R1 by a certain angle by the predetermined operational force is provided. At a using position (O) to be described later, by appropriately operating this operation lever L, the first auxiliary roller R1 is moved by a certain dimension into the reverse transfer direction. In conjunction with this, the transfer roller RT is also moved by a certain dimension into the reverse transfer direction to draw the tape glue T from the transfer face RTa of the transfer roller RT. As a result, the tape glue T can be sent to the paper slip P in a certain dimension. In addition, it is possible to selectively change the sending state that the tape glue T can be sent to the tape glue T in a certain dimension via the operation lever L into the normal state that this sending state is released. Further, an elongated face portion (not illustrated) elongated to the releasing side of an insertion space AS is formed on the upper face of the arm portion 6, the paper slip P is supported by this elongated face portion upon transfer, and the paper slip P can be easily inserted in the insertion space AS. Further, on the upper face of the elongated face portion, transfer start position display means for showing a transfer start position of the glue Tb on the paper slip P may be provided. As the transfer start position display means, on the upper face of the elongated face portion, one configured by a transfer start position display line provided approximately along the extended line of the rotational support shaft ST of the transfer roller RT and a mounting instruction display provided just on the back of this transfer start position display line may be available. It is preferable that any of the transfer start position display line and the mounting instruction display is in the form of a shallowly engraved mark on the upper face of the elongated face portion. As the transfer start position display line and the mounting instruction display, a straight line and the shape of the paper slip may be employed, respectively. Further, as these transfer start position display line and mounting instruction display, the ones printed on the upper face of the elongated face portion or the ones to which a seal is pasted may be available. In this way, the assured transfer operation and the usage direction free from errors are suggested to the user.

In order to assemble the transfer tool main body 1 with the transferred object receiver 2 that are configured as described above, at first, the shaft 418 that is provided on the first outside plate 41 of the transfer tool main body 1 is inserted into the bearing portion 511 formed on the base 5 of the transferred object receiver 2. Specifically, inserting the shaft 418 in the second large diameter part 511*b* formed at the rear edge portion side in the bearing portion 511 and screwing the screw V screwed in a screw hole formed on the shaft 418 in this state, the transferred object receiver 2 is integrally assembled with the transfer tool main body 1 so that the transferred object receiver 2 cannot be pulled out from the transfer tool main body 1. Further, according to the present embodiment, a so-called pleated screw is used as the screw V so as to simplify the screwing operation. Then, in this assembling state, the transferred object receiver 2 is set to be rotatable around the transfer tool main body 1 using a pivoting point between the shaft 418 and the second large diameter part 511*b* as a supporting point between an unused position (P) where the transferred object receiver 2 is separated from the transfer head H of the transfer tool main body 1 at a predetermined distance and a using position (O) where the transferred object receiver 2 abuts against or is near the transfer head H of the transfer tool main body 1. According to the present embodiment, in the case that the transferred object receiver 2 is located at the unused position (P), the upper edge portion 418*a* and the lower edge portion 418*b* of the shaft 418 are inclined with respect to the lower periphery portions 416 and 436 of respective outside plates 41 and 43 for a predetermined angle (in the present embodiment, about 15 degrees), so that the transferred object receiver 2 is inclined with respect to the transfer tool main body 1 for a predetermined angle (in the present embodiment, about 15 degrees) (refer to FIG. 5B). This state is defined as the initial state. Then, if the transferred object receiver 2 in the initial state (the unused position (P)) is rotatably moved to the using position (O), the shaft 418 abuts against the inner face of the opening portion 53*a* of the elastic member 53 that is disposed at the base 5 in the second large diameter portion 511*b* and thereby, the elastic member 53 is elastically deformed so that the opening height dimension of the opening portion 53*a* of the elastic member 53 is made large (refer to FIG. 5(*a*)). In this way, during the process of rotating the transferred object receiver 2 in a direction closing to the transfer tool main body 1 centering around the shaft 418 from the initial state, the elastically deforming parties are configured so as to accumulate the urging force urged to the direction separating the transferred object receiver 2 from the transfer tool main body 1 by elastically deforming the elastically deforming part due to the pressure welding force between the upper edge portion 418*a*, the lower edge portion 418*b* and the inside face of the opening portion 53*a*. As a result, to the transferred object receiver 2 at the using position (O), the force is acted into a direction returning the unused position (P) by a restoring force of the elastic member 53.

Figure 6:
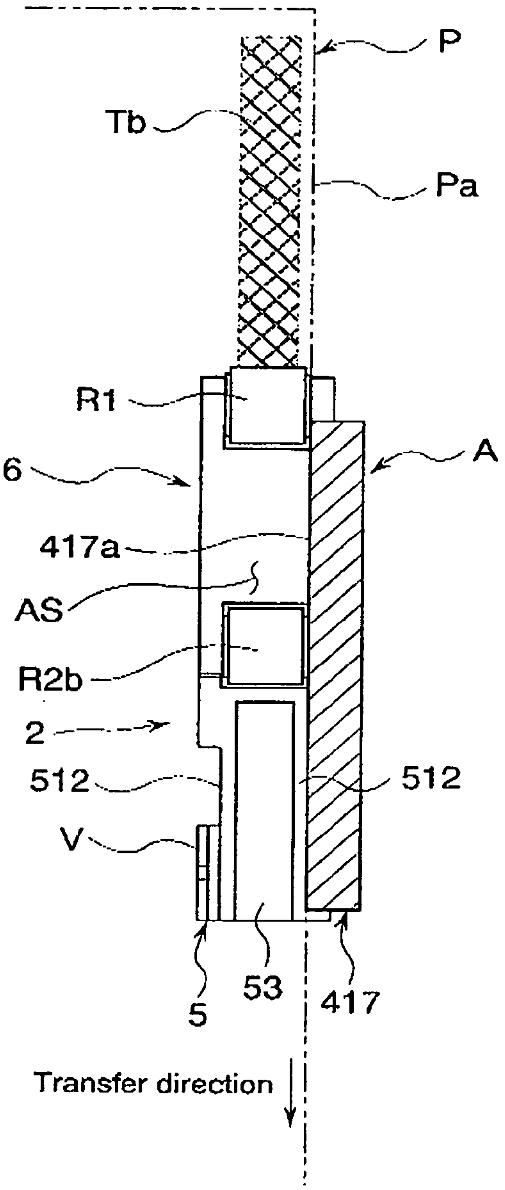
FIG. 6 is a cross sectional view with partially omitted taken along the line B-B in FIG. 3.

Thus, in the case that the transferred object receiver 2 is located at the using position (O), the elongated chip 417 disposed at the first outside plate 41 of the transfer tool main body 1 abuts against a part of the arm portion 6 of the transferred object receiver 2 (refer to FIG. 5(*a*)) so as to prevent the transfer tool main body 1 and the transferred object receiver 2 from moving close each other for a predetermined distance or more. In this way, the elongated chip 417 functions as the regulating means of the present invention to prevent the transfer tool main body 1 and the transferred object receiver 2 from moving close each other for a predetermined distance or more upon transfer. Further, at the using position (O), the transfer roller RT disposed at the transfer tool main body 1 and the first auxiliary roller R1 disposed at the transferred object receiver 2 are opposed each other abutting or coming close together; at the position separated from the opposed position of these transfer roller RT and the first auxiliary roller R1 at a predetermined distance in the transfer direction, the second auxiliary roller R2*a* disposed at the transfer tool main body 1 and the second auxiliary roller R2*b* disposed at the transferred object receiver 2 are opposed with each other abutting or coming close together; the insertion space AS is formed between the transfer tool main body 1 and the transferred object receiver 2, through which the paper slip P can be inserted. In this case, in the insertion space AS, the transfer face RTa of the transfer roller RT and a backing face R1*a* of the first auxiliary roller R1 are opposed with each other abutting or coming close together; the lower edge portion of the second auxiliary roller R2*a* disposed at the transfer tool main body 1 and the upper edge portion of the second auxiliary roller R2*b* disposed at the transferred object receiver 2 are opposed with each other abutting or coming close together. The insertion space AS is formed between the lower edge portions 416 and 436 of the first outside plate 41 and the second outside plate 43 and the upper edge portions of the base 5 and the arm portion 6. As shown in FIG. 6, one side of the insertion space AS is approximately closed by the elongated chip 417 and the insertion space AS is continuously opened in three directions, namely, the transfer direction, the direction of the other side that can be opposed to the elongated chip 417, and the reverse transfer direction.

Figure 7:
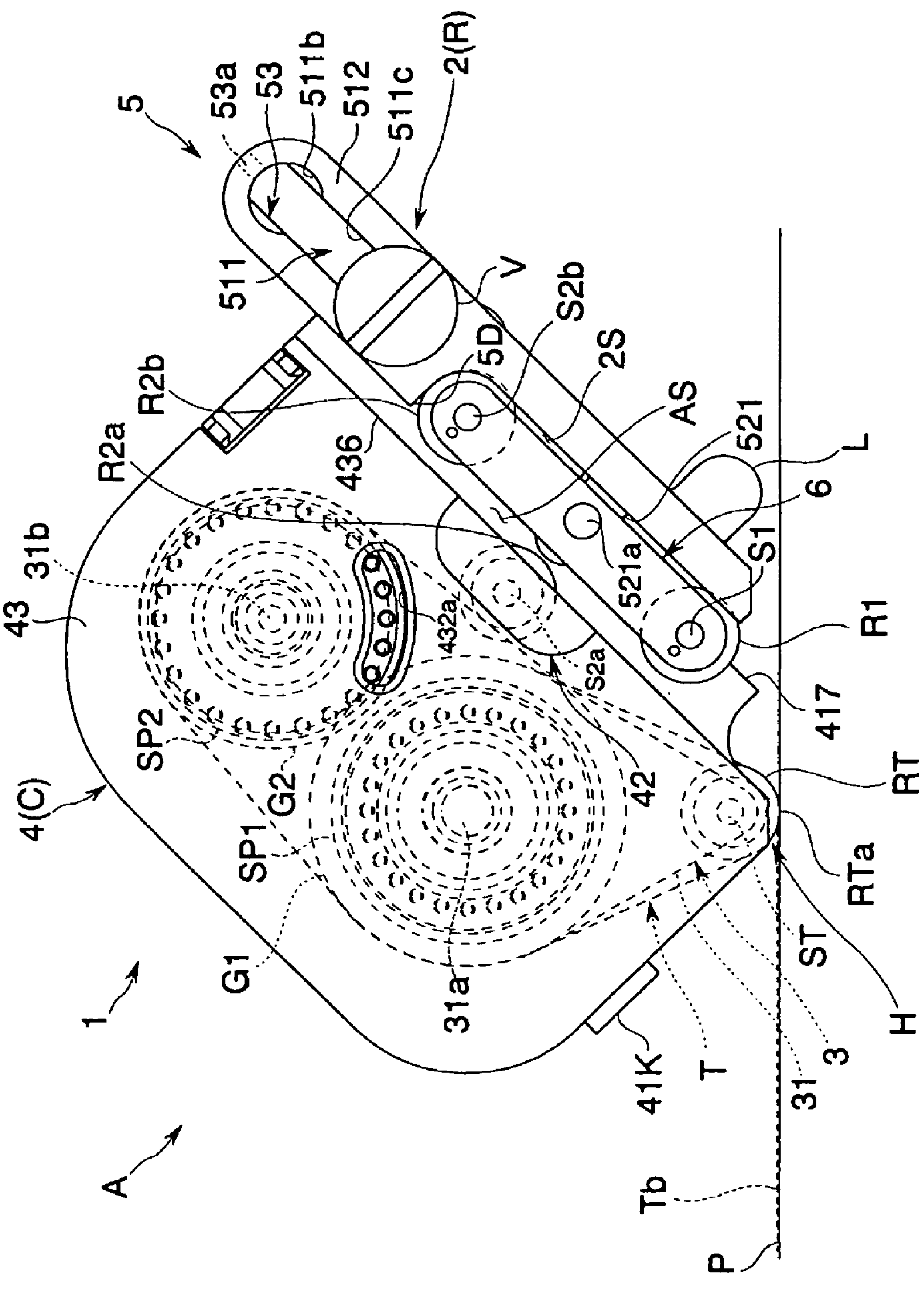
FIG. 7 is a schematic side view with partially omitted showing the transfer tool according to the embodiment.
Figure 8:
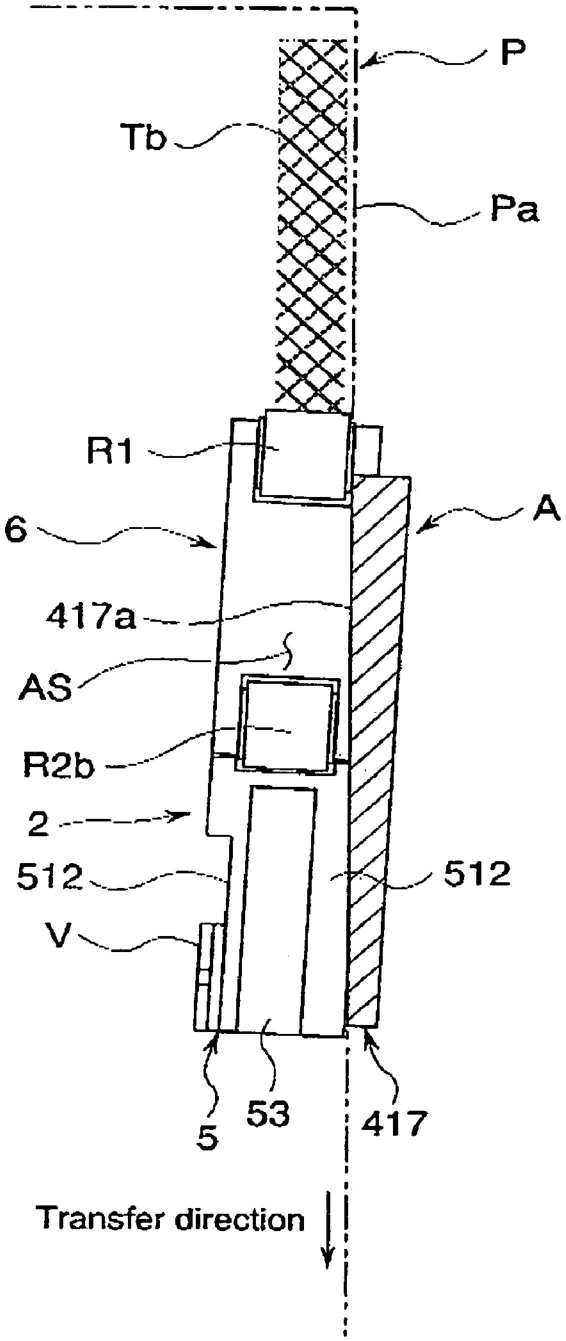
FIG. 8 is a view showing a modified example of the transfer tool according to the embodiment in relation to FIG. 6.

On one hand, in the case that the shaft 418 is located at the second large diameter portion 511*b* of the bearing portion 511, the transferred object receiver 2 is located at a transfer head covered position (Q) where the transferred object receiver 2 can cover the front end portion of the transfer head H. If the shaft 418 is slidably moved toward the first large diameter portion 511*a* along the elongated direction of the groove 511*c* of the bearing portion 511 from this state, as shown in FIG. 7, the transferred object receiver 2 becomes a transfer head exposed position (R) where the front end portion of the transfer head H is exposed. Thus, by slidably moving the shaft 418 along the elongated direction of the groove 511*c* of the bearing portion 511 using the shaft 418 and the bearing portion 511, the slidable moving mechanism according to the present invention is configured, in which the transferred object receiver 2 can be slidably moved with respect to the transfer tool main body 1 between the transfer head covered position (Q) and the transfer head exposed position (R).

Next, a method of using the transfer tool A having such a configuration and its working will be described.

At first, the user puts his or her thumb on the transfer tool main body 1 and puts other fingers on the transferred object receiver 2 so as to hold the transfer tool A. In this case, the user holds transfer tool A so that the elongated chip 417 of the transfer tool main body 1 is located at the user's palm's side. Then, with the transferred object receiver 2 located at the unused position (P), the user brings the paper slip P and the transfer tool A close together so that the edge Pa of the paper slip P abuts against or is near the elongated chip 417 of the transfer tool main body 1. In succession, the operational force is given in a direction to bring the transferred object receiver 2 close to the transfer head H. In other words, if the user strongly grips the transfer tool A, the transferred object receiver 2 is rotatably moved with respect to the transfer tool main body 1 to be located at the using position (O). In this case, as described above, the elongated chip 417 abuts against a part of the arm portion 6, the transfer roller RT and the first auxiliary roller R1 are opposed with each other sandwiching the paper slip P, and the second auxiliary rollers R2*a* and R2*b* are opposed with each other sandwiching the paper slip P. In this way, with the paper slip P sandwiched between the transfer tool main body 1 and the transferred object receiver 2, the transfer face RTa of the transfer roller RT is brought into contact with the surface of the paper slip P to slidably move the transfer tool A into the transfer direction. Then, when slidably moving the transfer tool A into the transfer direction, with the edge Pa of the paper slip P and the elongated chip 417 abutted each other, the paper slip P is configured to be guided to the elongated chip 417 so as to be capable of moving within the insertion space AS (refer to FIG. 6). Thus, the elongated chip 417 also functions as the guide means according to the present invention. In accordance with the operation to slidably move the transfer tool A into the transfer direction, the first auxiliary roller R1 is set to be synchronously rotated in conjunction with the transfer roller RT while bringing the backing face R1*a* into contact with the rear surface of the paper slip P and a pair of second auxiliary rollers R2*a* and R2*b* are synchronously rotated due to the friction force with the paper slip P, so that the stable transfer operation can be carried out. Then, it is configured so that by setting the arm portion 6 of the transferred object receiver 2 to be capable of performing the balancing operation with respect to the base 5, the first auxiliary roller R1 and the second auxiliary roller R2*b* provided at the arm portion 6 are appropriately connected to or separated from the transfer roller RT and the second auxiliary roller R2*a* provided on the transfer tool main body 1, and at least the backing face R1*a* of the first auxiliary roller R1 may contact the rear face of the paper slip P upon transfer. Further, upon transfer, the tape glue T sandwiched between the transfer face RTa and the paper slip P is sent from the winding off spool SP1 that is rotated together with the winding off gear G1 by the frictional force. Simultaneously with this glue T adhered on the one side of a tape main body Ta is adhered to the paper slip P, the rolling up spool SP2 is rotated together with the rolling up gear G2 that is reversely rotated in accordance with the winding off gear G1, so that the tape main body Ta having no glue Tb on its one side will be winded by the rolling up spool SP2. Then, after the desirable area on the paper slip P is transferred, by stopping transfer of the operational force into a direction to bring the transferred object receiver 2 close to the transfer tool main body 1, the transferred object receiver 2 is rotatably moved into a direction being separated from the transfer head H by the restoration force (the bias force) of the elastic member 53 provided at the base 5 to be located at the unused position (P).

In addition to the usage mode that the transfer tool A according to the present embodiment is used with the paper slip P sandwiched between the transfer tool main body 1 and the transferred object receiver 2, as shown in FIG. 7, the transfer tool A according to the present embodiment also can employ the usage mode that only the transfer tool main body 1 is brought into contact with the paper slip P to transfer the tape glue T on the paper slip P without sandwiching the paper slip P between the transfer tool main body 1 and the transferred object receiver 2. In other words, by using slidably moving means configured from the shaft 418 and the bearing portion 511, the transferred object receiver 2 located at the transfer head covered position (Q) is slidably moved into a back side (the transfer direction) with respect to the transfer tool main body 1 so as to locate the transfer tool A at the transfer head exposed position (R). Then, by bringing the transfer head H into contact with the paper slip P and slidably moving the transfer tool A in the transfer direction, the transfer tool A of the present embodiment can transfer the transfer material on the transferred object in the same usage mode as the well known transfer tool A. In addition, after the transfer operation, by slidably moving the transferred object receiver 2 located at the transfer head exposed position (R) into a front side (the reverse transfer direction) with respect to the transfer tool main body 1, the transfer tool A may be located at the transfer head covered position (Q). Further, in the case that the tape glue T has been completely used or in the case that the transfer head H is exchanged, releasing the state that the latching chip 41K of the first outside plate 41 is engaged with the latching hole 43K formed at the front periphery portion 43 of the second outside plate 43, the case 4 is located at the releasing position, and detaching the refill cartridge 3 from the case 4, the other refill cartridge 3 may be attached to the case 4.

Thus, the transfer tool A of the present embodiment is provided with the transfer tool main body 1 and the transferred object receiver 2 that can be relatively rotated with respect to this transfer tool main body 1. The transfer tool A of the present embodiment is configured to be slidably moved into a predetermined transfer direction while bringing the transfer face RTa of the transfer head H into contact with the paper slip P with the paper slip P sandwiched between the transfer tool main body 1 and the transferred object receiver 2 so as to transfer the tape glue T on the paper slip P. Therefore, it is not necessary to prepare a board such as a table and a desk on which the paper slip P is mounted upon transfer, and the transfer can be easily carried out in any places.

In addition, since the insertion space AS is continuously opened in three directions, namely, the transfer direction, the reverse transfer direction, and the direction that is orthogonal to the transfer direction and the reverse transfer direction, the specification and the shape of the paper slip P that can be transferred are not limited to the inside dimension of the insertion space AS. Therefore, by sending the transferred object inserted from the reverse transfer direction to the transfer directional side, the present transfer tool can preferably transfer the transfer material on the paper having any specifications and any shapes. In addition, by inserting the paper slip P in the insertion space AS formed between the transfer tool main body 1 and the transferred object receiver 2 with the transferred object receiver 2 located at the using position (O) and slidably moving the paper slip P into the transfer direction, it may be possible to transfer the tape glue T on the paper slip P.

Particularly, since the first auxiliary roller R1 that can be rotated in conjunction with the transfer roller RT upon the transfer is provided at the transferred object receiver 2, the transfer operation with the paper slip P sandwiched can be smoothly carried out. Further, since the first auxiliary roller R1 is provided at the position being opposed to the transfer roller RT, the first auxiliary roller R1 can be closely related to the first auxiliary roller R1, so that the stable rotational operation of the first auxiliary roller R1 can be realized.

In addition, since the first auxiliary roller R1 is configured to have the backing face R1*a* that is located at the region being opposed to the transfer face RTa of the transfer roller RT and can contact the rear face of the paper slip P upon the transfer so as to relatively connect or separate the backing face R1*a* to or from the transfer face RTa, bite of the first auxiliary roller R1 into the paper slip P can be improved. In addition, since the first auxiliary roller R1 is formed by a cushion material that is elastically deformed in a direction to connect or separate the first auxiliary roller R1 to or from the transfer head H, the bite to the paper slip P of the first auxiliary roller R1 can be further improved.

Further, since a pair of second auxiliary rollers R2*a* and R2*b* opposed at the side of the transfer tool main body 1 and the side of the transferred object receiver 2 is disposed at a different position from the opposed position of the transfer roller RT and the first auxiliary roller R1 in the insertion space AS, the paper slip P can be sandwiched at two places in the insertion space AS. Therefore, it is possible to effectively solve the defect such that the paper slip P is misaligned from the transfer tool A upon the transfer and the rectilinear propagation property of the transfer tool A to the paper slip P can be effectively improved.

The transferred object receiver 2 is configured so as to be relatively movable with respect to the transfer tool main body 1 between the transfer head covered position (Q) where the front end portion of the transfer head H can be covered and the transfer head exposed position (R) where the front end portion of the transfer head H is exposed. Therefore, in the case of setting the transferred object receiver 2 at the transfer head exposed position (R), the transfer tool A of the present embodiment can be used as same as the known transfer tool, namely, it can be used in the mode that the paper slip P is not sandwiched, so that the transfer tool A of the present embodiment can be used separately depending on the application and the transfer tool A of the present embodiment becomes more practical. Particularly, the slidably moving means is provided, which relatively moves the transfer tool A between the transfer head covered position (Q) and the transfer head exposed position (R) by slidably moving the transferred object receiver 2 in the transfer direction or the reverse transfer direction with respect to the transfer tool main body 1, so that the transfer tool A can be located at the transfer head covered position (Q) or at the transfer head exposed position (R) with the simple operation. Specifically, the slidably moving means is configured from the shaft 418 provided at the transfer tool main body 1 and the bearing portion 511 formed on the transferred object receiver 2 so as to support the shaft 418; the groove 511*c* through which the shaft 418 can be inserted and which is elongated to the transfer direction or the reverse transfer direction is formed on the bearing portion 511; and the transferred object receiver 2 is configured so as to slidably move with respect to the transfer tool main body 1 between the transfer head covered position (Q) and the transfer head exposed position (R) by slidably moving the shaft 418 along the elongated direction of the grove 511*c*; so that the transfer tool A can be located at the transfer head covered position (Q) or the transfer head exposed position (R) with the simple configuration and the simple operation and this makes the transfer tool A to be excellent in usability.

In addition, since the regulating means to prevent the transfer tool main body 1 and the transferred object receiver 2 from moving close each other for a predetermined distance or more is upon transfer provided, it is possible to prevent so-called bite and the deformation and the damage of the member that may occur when the transfer tool main body 1 and the transferred object receiver 2 come close together beyond necessity. Further, since the dimension to sandwich the paper slip P is made constant, the transfer operation can be smoothly carried out. Particularly, since it is configured so that the regulating means uses the elongated chip 417 that is provided at the transfer tool main body 1 and is elongated to the other side and the elongated chip 417 can abut against the transferred object receiver 2 by priority upon the transfer, it is possible to assuredly prevent the transfer tool main body 1 and the transferred object receiver 2 from coming close together for a predetermined distance or more employing the very simple structure.

Further, this elongated chip 417 functions as the guide means that can abut against the edge portion Pa of the paper slip P when the paper slip P is inserted in the insertion space AS and the paper slip P is configured to be guided by this guide means, namely, the elongated chip 417 so as to be movable in the insertion space AS. Therefore, by abutting the edge portion Pa of the paper slip P against the elongated chip 417, the insertion depth dimension of the paper slip P with respect to the transfer tool A is made constant. By performing the transfer with this insertion depth dimension kept, the transfer trace that is approximately in parallel with the edge portion Pa of the paper slip P can be transferred like drawing it. In addition, since the elongated chip 417 can close one side along the transfer direction in the insertion space AS, it is possible to keep the dimension of sandwiching the paper slip P and the insertion depth dimension of the paper slip Pinto the insertion space AS constant.

Further, the present invention is not limited to the above-detailed described embodiment.

For example, by sliding the transfer face of the transfer head on the surface of the transferred object such as a paper slip upon transfer, the transfer material such as tape glue may be transferred on the transferred object such as a paper slip. Specifically, a transfer tool employing a transfer head provided with a face plate having the transfer face sliding on the surface of the transferred object without rotating upon transfer may be considerable. According to such a transfer tool, as compared to the embodiment using the transfer roller, it is not necessary to attach the rotational support shaft, so that the structure can be simplified and the number of parts can be reduced.

In addition, it is not always necessary to provide the first auxiliary roller at the position opposed to the transfer roller and the first auxiliary roller may be in conjunction with the transfer roller upon transfer.

In order to further effectively improve the rectilinear propagation property of the transfer tool with respect to the transferred object, in the insertion space, two and more pairs of the second auxiliary rollers may be provided, which are opposed to the side of the transfer tool main body and the side of the transferred object receiver.

In addition, a first endless track mechanism winding a crawler track between at least one second auxiliary roller and at least one transfer roller may be provided at the transfer tool main body. According to such an embodiment, it is possible to smoothly carry out the transfer operation by using the crawler track rotated in accordance with the synchronization rotational operation of each roller. In this case, it is preferable that the crawler track is winded so as not to fall on the transfer face of the transfer roller. Further, if a second endless track mechanism winding a crawler track between at least one second auxiliary roller and at least first auxiliary roller is provided at the transferred object receiver, it is possible to smoothly carry out the transfer operation in a stable state.

The insertion space may be continuously opened to three directions, namely, at least a predetermined transfer direction, a reverse transfer direction, and a direction that is orthogonal to the transfer direction and the reverse transfer direction. Further, the insertion space may be continuously opened to four directions, namely, the transfer direction, the reverse transfer direction, and the both directions that are orthogonal to the transfer direction and the reverse transfer direction.

Further, as the embodiment that the transferred object receiver is configured so as to be relatively movable with respect to the transfer tool main body between the transfer head covered position and the transfer head exposed position, not limited to the embodiment of using the slidably moving mechanism exemplified as above, the embodiment of using a rotatably moving mechanism to relatively move the transferred object receiver between the transfer head covered position and the transfer head exposed position by rotatably moving the transferred object receiver in a predetermined direction with respect to the transfer tool main body may be adopted. In this case, the rotatably moving mechanism is configured by the shaft disposed at the transfer tool main body and the bearing portion formed so as to rotatably support the shaft at the transferred object receiver and the transferred object receiver may be configured so as to rotatably move with respect to the transfer tool main body between the transfer head covered position and the transfer head exposed position using the pivoting point of the shaft and the bearing portion as a support point. According to such an embodiment, by rotatably clearing the transferred object receiver located at the transfer head covered position, the transferred object receiver may be located at the transfer head exposed position and the operation becomes simple.

In addition, the elongated chip configuring the regulating means and/or the guide means may be provided at the transferred object receiver and may be elongated toward the transfer tool main body. Further, the regulating means and the guide means may be formed by different members, respectively.

Figure 9:
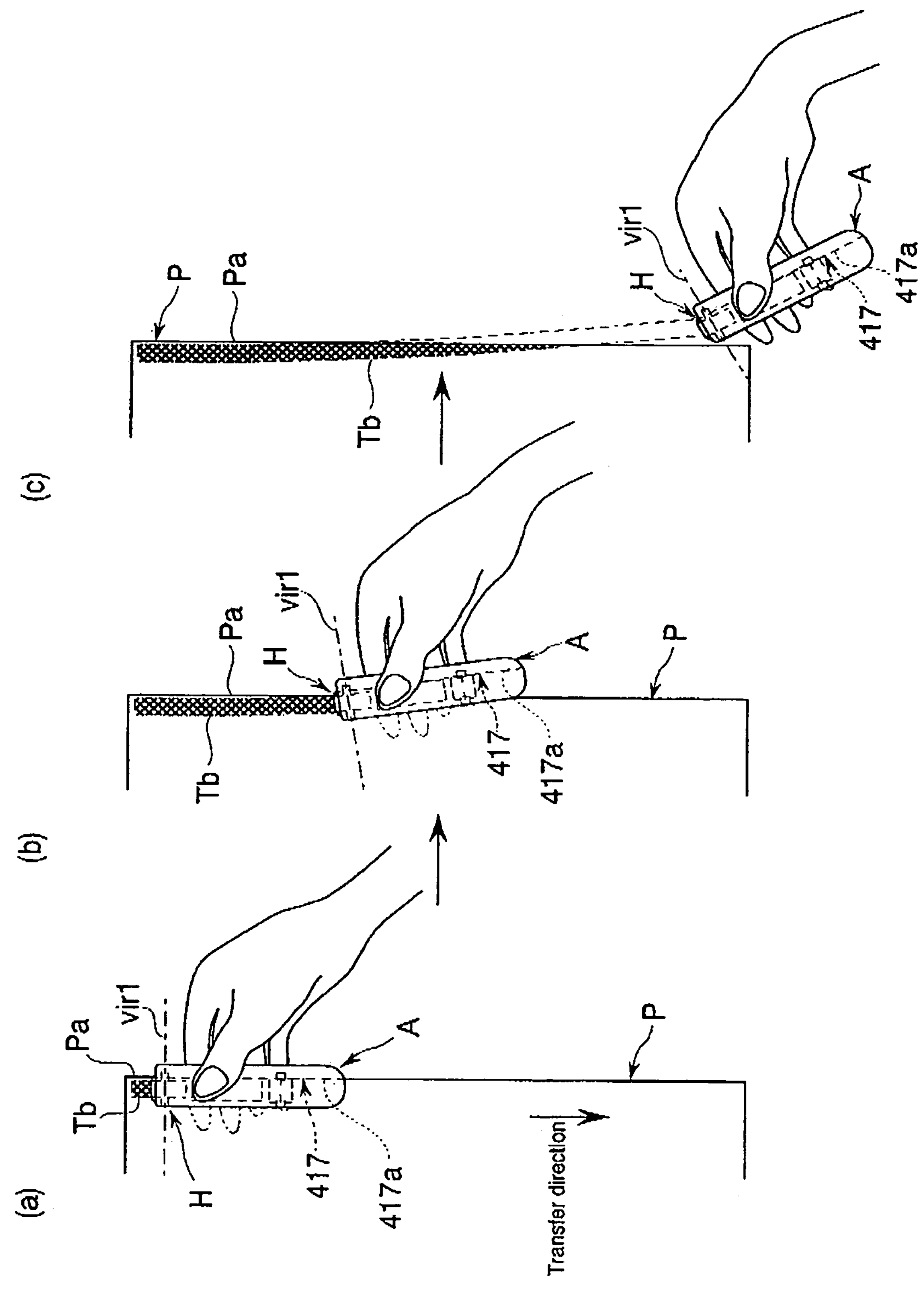
FIGS. 9*a-c* are operational explanatory views of one embodiment of the transfer tool in a first, second, and third position.
Figure 10:
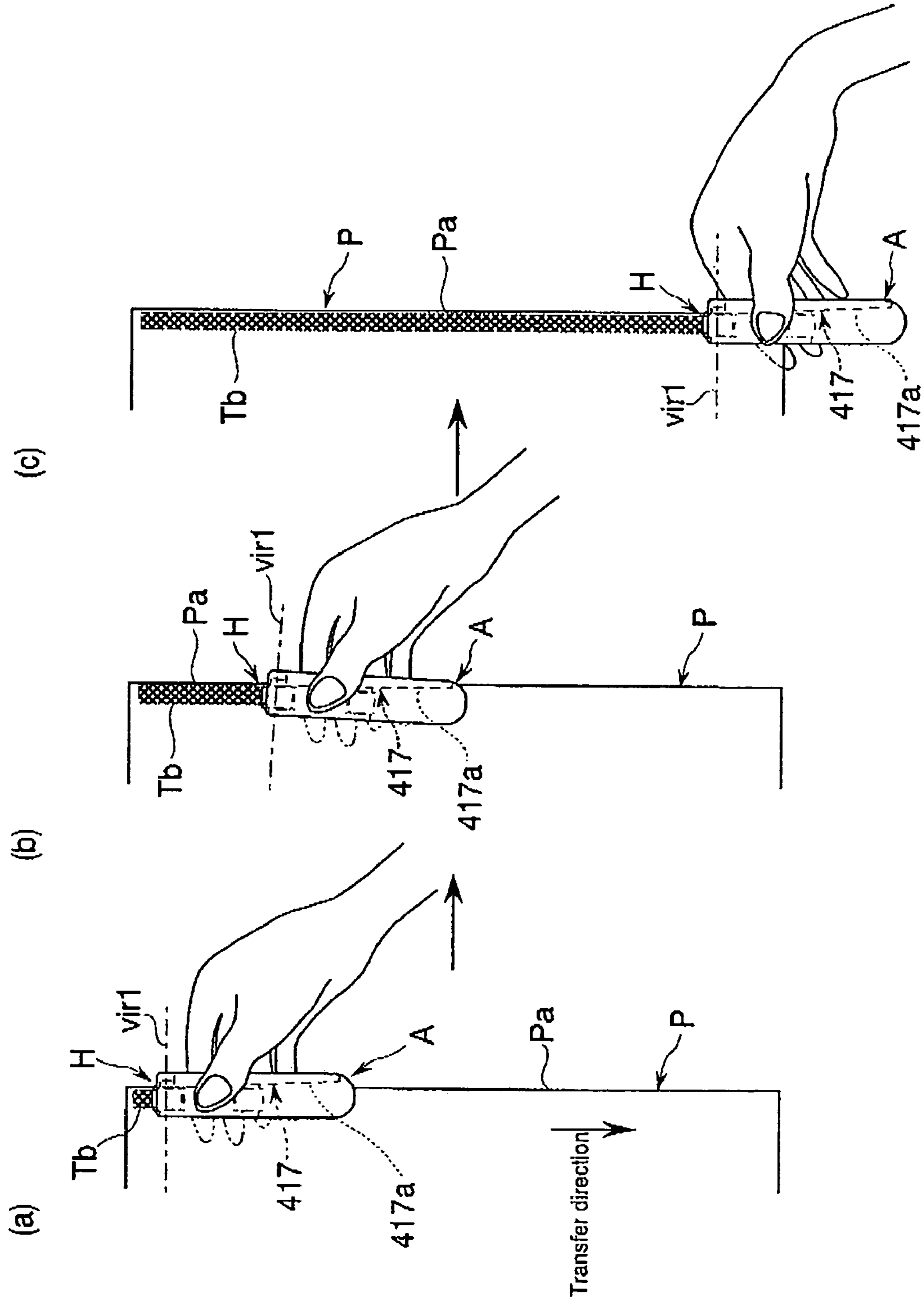
FIGS. 10*a-c* operational explanatory views of one embodiment of the transfer tool in a first, second, and third position.

Further, an inward face located at least the side of the insertion space in the elongated chip and the first virtual standing face passing through the transfer face of the transfer head may be set to form a blunt angle opening to the transfer direction. According to such an embodiment, as shown in FIG. 9, it is possible to prevent a defect that the track of transfer generated when the user turns his or her wrist upon transfer in the case that an inward face 417*a* of the elongated chip 417 and the first virtual standing face vir1 that is a virtual standing face passing through the transfer face of the transfer head H are approximately orthogonal to each other, describes an arc, and the rectilinear propagation property upon the transfer can be improved. Specifically, as shown in FIG. 10, it is preferable that the first virtual standing face vir1 is orthogonal to the transfer direction and the angle formed by the inward face 417*a* and the first virtual standing face vir1 may be set to be the blunt angle opening to the transfer direction. Thus, by correcting the inward face 417*a* in advance anticipating the curving direction with respect to the transfer direction, even if the user's wrist is turned upon transfer, the track of transfer is difficult to curve and the user can transfer the transfer material approximately in a straight line. In this case, if the elongated chip is provided at the transfer tool main body (not illustrated) and the outside plate that is an outside wall of the transfer tool main body is set to be approximately in parallel with the inward face of the elongated chip, with the transferred object such as a paper slip sandwiched between the transfer tool main body and the transferred object receiver, at least the outside plate of the transfer tool main body is apparently made in approximately parallel with the edge portion of the paper slip. Even if the inward face is inclined to the first virtual standing face for a predetermined angle, the user can perform the transfer operation without uncomfortable feeling. In addition, setting the inward face so that a second virtual standing face that is a virtual standing face standing along the transfer direction and the inward face are be in parallel each other and setting that this inward face and the first virtual standing face forms a blunt angle opening to the transfer direction, the same advantage can be obtained.

In addition, by providing the first auxiliary roller cradle for supporting the rotational support shaft of the first auxiliary roller on the transferred object receiver and configuring this first auxiliary roller cradle so as to be elastically deformed in a direction connecting or separating this first auxiliary roller cradle to and from the transfer head, it is preferably possible to close or separate the transfer head and the first auxiliary roller that opposed corresponding to the thickness or the like of the transferred object. As the specific embodiment of the first auxiliary roller cradle, the one is available, in which a slit is formed around the first auxiliary roller cradle within a range that the first auxiliary roller cradle and the transferred object receiver are not separated and the first auxiliary roller cradle can move up and down with respect to the transferred object receiver using a continuous part continued to the transferred object receiver as a support point via this slit. Further, at least one second auxiliary roller may be provided on the transferred object receiver, and the second auxiliary roller cradle supporting the rotational support shaft of the second auxiliary roller may be formed so as to be elastically deformed to a direction connecting or separating to or from the other second auxiliary roller that is provided at the transfer tool main body so that the second auxiliary roller cradle is opposed to one second auxiliary roller. As the specific embodiment of the second auxiliary roller cradle, the one may be available, in which a slit is formed around the second auxiliary roller cradle within a range that the second auxiliary roller cradle is not separated from the transferred object receiver and the second auxiliary roller cradle can move up and down with respect to the transferred object receiver using a continuous part continued to the transferred object receiver as a support point via this slit. By adopting such a structure, it is possible to flexibly change a distance between the opposed rollers with respect to the thickness of the transferred object and as a result, it is preferably possible to certainly hold the transferred object sandwiched between the rollers.

In addition, the tape glue as the transfer material may be any of solid or liquid glue and the present transfer tool may be applied a general transfer material to be transferred on the transferred object such as various tapes including a correction tape, an adhesive tape, and an incohesive tape, and an adhesive or the like.

The specific structures of respective parts are not limited to the above-described embodiments and various modifications are possible in a scope not deviating from the spirit of the present invention.

INDUSTRIAL APPLICABILITY

According to the present invention, since it is possible to use the transfer tool in the innovative and unconventional embodiment such that the transfer is carried out with the transferred object such as paper sandwiched between the transfer tool main body and the transferred object receiver, a board such as a table and a desk on which the transferred object is mounted are not needed upon transfer and the transfer can be easily carried out in any places. As a result, the operation to further mount the underlay on the surface of the table or the like is naturally unnecessary, so that the transfer operation can be immediately performed and this improves the practical utility of the present transfer tool. In addition, since the insertion space is continuously opened in three directions, namely, a predetermined transfer direction, a reverse transfer direction, and a direction orthogonal to the transfer direction and the reverse transfer direction, the specification and the shape of the transferred object that can be transferred are not limited to the inside dimension of the insertion space. Therefore, by transferring the transferred object inserted from the reverse transfer directional side to the transfer directional side, the transfer can be preferably made on the transferred object with any specification and any shape. Further, the present transfer tool also can transfer the transfer material on the transferred object by inserting the transferred object in the insertion space formed between the transfer tool main body and the transferred object receiver with the transfer tool main body brought close to the transferred object receiver in advance, and sliding and moving the transferred object to the transfer direction. The present transfer tool can be applied to various usage modes depending on the application.

The invention claimed is:

1. A transfer tool that is used for transferring a transfer material on a transferred object such as paper, comprising:

a transfer tool main body having a transfer head that can bring at least the transfer material into contact with the transferred object; and a transferred object receiver that is accompanied by the transfer tool main body;

wherein the transfer head has a transfer face that is a region contacting the transferred object and transferring the transfer material when transferring the transfer material on the transferred object;

an insertion space is formed between the transfer tool main body and the transferred object receiver, in which the transferred object can be inserted;

the transfer head is positioned so that at least the transfer face is exposed in the insertion space; and the transfer material is transferred on the transferred object by slidably moving the transfer face in a predetermined transfer direction while bringing the transfer face into contact with the transferred object with the transferred object inserted in the insertion space and the transferred object sandwiched between the transfer tool main body and the transferred object receiver, wherein the transfer head comprises a transfer roller having the transfer face that can be rotated upon transfer, a first auxiliary roller is provided on the transferred object receiver, which can be rotated in conjunction with the transfer roller upon transfer, and the first auxiliary roller is formed by a cushion material that is elastically deformed at least in a direction connecting and separating to and from the transfer head.

2. The transfer tool according to claim 1, wherein the insertion space is continuously opened to three directions comprising at least a predetermined transfer direction, a reverse transfer direction, and a direction that is orthogonal to the transfer direction and the reverse transfer direction.

3. The transfer tool according to claim 1, wherein the transfer material is transferred on the transferred object by sliding the transfer face of the transfer head on the surface of the transferred object upon transfer.

4. The transfer tool according to claim 1, wherein the first auxiliary roller is provided at a position opposed to the transfer roller.

5. The transfer tool according to claim 1, wherein the first auxiliary roller has a backing face that is a region that can be opposed to the transfer face and can contact the rear face of the transferred object upon transfer and the backing face and the transfer face are relatively connected and separated each other.

6. The transfer tool according to claim 5, wherein the transferred object receiver comprises a base and at least the first auxiliary roller, and further comprises an arm portion that can carry out a balancing operation with respect to the base.

7. The transfer tool according to claim 5, wherein a first auxiliary roller cradle supporting a rotational support shaft of the first auxiliary roller is configured so as to be elastically deformed in a direction connecting and separating to and from the transfer head.

8. The transfer tool according to claim 1, wherein at least a pair of second auxiliary rollers is provided, which are opposed at the side of the transfer tool main body and the side of the transferred object at a position in the insertion space that is different from the position where the transfer roller is opposed to the first auxiliary roller.

9. The transfer tool according to claim 8, wherein a first endless track mechanism winding a crawler track between at least one second auxiliary roller and at least one transfer roller is provided with the transfer tool.

10. The transfer tool according to claim 8, wherein a second endless track mechanism winding a crawler track between at least one second auxiliary roller and at least first auxiliary roller is provided at the transferred object receiver.

11. The transfer tool according to claim 8, wherein the transferred object receiver comprises a base and at least one second auxiliary roller and further comprises an arm portion that can carry out the balancing operation with respect to the base.

12. The transfer tool according to claim 8, wherein the transferred object receiver comprises at least one second auxiliary roller of the pair of second auxiliary rollers and a second auxiliary roller cradle supporting a rotational support shaft of the second auxiliary roller is configured so as to be elastically deformed in a direction connecting and separating to and from the other second auxiliary roller of the pair of second auxiliary rollers that is provided with the transfer tool main body so as to be opposed to the one second auxiliary roller.

13. The transfer tool according to claim 8, wherein the transferred object receiver is configured so as to be relatively movable with respect to the transfer tool main body between a transfer head covered position where the front end portion of the transfer head can be covered and a transfer head exposed position where the front end portion of the transfer head is exposed.

14. The transfer tool according to claim 13, comprising:

a slidably moving mechanism which relatively moves the transferred object receiver between the transfer head covered position and the transfer head exposed position by slidably moving the transferred object receiver in the transfer direction or in the reverse transfer direction with respect to the transfer tool main body.

15. The transfer tool according to claim 14, wherein the slidably moving mechanism is configured by a shaft provided at the transfer tool main body and a bearing portion formed on the transferred object receiver so as to support the shaft;

a groove is formed on the bearing portion, in which the shaft can be inserted and which is elongated in the transfer direction or the reverse transfer direction; and the transferred object receiver is configured so as to be slidably movable with respect to the transfer tool main body between the transfer head covered position and the transfer head exposed position by slidably moving the shaft along the elongated direction of the groove.

16. The transfer tool according to claim 13, comprising: a rotatably moving mechanism which relatively moves the transferred object receiver between the transfer head covered position and the transfer head exposed position by rotatably moving the transferred object receiver in a predetermined direction with respect to the transfer tool main body.

17. The transfer tool according to claim 16, wherein the rotatably moving mechanism is configured by a shaft provided at the transfer tool main body and a bearing portion formed on the transferred object receiver so as to rotatably support the shaft; and the transferred object receiver is configured so as to be rotatably movable with respect to the transfer tool main body between the transfer head covered position and the transfer head exposed position using a pivoting point between the shaft and the bearing portion as a support point.

18. The transfer tool according to claim 1, comprising:

a regulating means that prevents the transfer tool main body and the transferred object receiver from moving within a predetermined distance from one another upon transfer.

19. The transfer tool according to claim 18, wherein the regulating means uses an elongated chip that is provided at one of the transfer tool main body or the transferred object receiver and an elongated portion of the chip extends to the other one; and the elongated chip abuts against the other one when transferring the transfer material on the transferred object.

20. The transfer tool according to claim 19, wherein the elongated chip can close one side along the transfer direction.

21. The transfer tool according to claim 19, wherein an inward face located at least the side of an insertion space of the elongated chip and a first virtual standing face that is a virtual standing face passing through a transfer face forms a blunt angle opening to the transfer direction.

22. The transfer tool according to claim 21, wherein when the first virtual standing face is arranged orthogonal to the transfer direction, the inward face and the first virtual standing face form the blunt angle opening to the transfer direction.

23. The transfer tool according to claim 22, wherein the elongated chip is provided at the transfer tool main body, and an outside wall of the transfer tool main body is set to be located approximately in parallel with an inward face.

24. The transfer tool according to claim 21, wherein the inward face is set so as to be located in parallel with a second virtual standing face that is a virtual face standing along the transfer direction, and the inward face and the first virtual standing face forms a blunt angle opening to the transfer direction.

25. The transfer tool according to claim 1, comprising:

guide means that can abut against the edge portion of the transferred object when the transferred object is inserted in the insertion space;

wherein the transferred object is guided by this guide means so as to be movable in the insertion space.

26. The transfer tool according to claim 25, wherein the guide means uses an elongated chip that is provided at any one of the transfer tool main body or the transferred object receiver and is elongated to the other one.

27. The transfer tool according to claim 1, comprising: a regulating means that prevents the transfer tool main body and the transferred object receiver from moving within a predetermined distance from one another upon transfer;

wherein the regulating means functions as the guide means that can abut against the edge portion of the transferred object when the transferred object is inserted in the insertion space.

28. The transfer tool according to claim 27, wherein the regulating means uses an elongated chip that is provided at one of the transfer tool main body or the transferred object receiver and an elongated portion of the chip extends to the other one; the elongated chip abuts against the other one when transferring the transfer material on the transferred object; and the guide means uses the elongated chip.

29. The transfer tool according to claim 1, wherein a shaft to rotatably support the transferred object receiver with respect to the transfer tool main body is firmly fixed to the transfer tool main body;

a pair of opposed edge portions is formed on the shaft, the opposed edge portions being located approximately in parallel with each other at least seen from the side and are elongated along an elongated direction of the transferred object receiver; and the initial state being set so that the pair of opposed edge portions are different from the transfer direction;

an elastically deforming part is provided, in which a bearing portion for inserting the shaft is formed at the transferred object receiver and an opening portion having the approximately same opening dimension as the distance between the opposed edge portions of the shaft is formed; and the shaft is inserted in a region where the opening portion and the bearing portion are communicated in the initial state; and by elastically deforming the elastically deforming part due to the pressure welding force between the opposed edge portion and the inside portion of the opening portion during the process of rotating the transferred object receiver in a direction closing to the transfer tool main body centering around the shaft from the initial state that the opposed edge portion and the inside portion of the opening portion are contacted under pressure; and thus, an urging force to urge the transferred object receiver to a direction to separate the transferred object receiver from the transfer tool main body is generated.

* * * * *